United States Patent
Wei

(10) Patent No.: US 7,393,168 B2
(45) Date of Patent: Jul. 1, 2008

(54) RETRACTABLE FASTENER DEVICE AND METHOD FOR FACILITATING THE FASTENING OF MULTIPLE OBJECTS

(75) Inventor: Chih-Shing Wei, Lattingtown, NY (US)

(73) Assignee: Grace-Comp Systems, Ltd., Lattingtown, NY (US)

( * ) Notice: Subject to any disclaimer, the term of this patent is extended or adjusted under 35 U.S.C. 154(b) by 203 days.

(21) Appl. No.: 11/173,206

(22) Filed: Jul. 1, 2005

(65) Prior Publication Data
US 2006/0024148 A1    Feb. 2, 2006

Related U.S. Application Data

(63) Continuation-in-part of application No. 10/903,776, filed on Jul. 30, 2004, now Pat. No. 7,153,074.

(51) Int. Cl.
*F16B 13/04* (2006.01)
(52) U.S. Cl. ............... 411/21; 411/347; 411/348
(58) Field of Classification Search ............... 411/21, 411/337, 344, 347, 348, 349, 549, 553
See application file for complete search history.

(56) References Cited

U.S. PATENT DOCUMENTS

| | | | |
|---|---|---|---|
| 1,854,737 A | 4/1932 | Haug | |
| 2,597,857 A * | 5/1952 | Francis | 411/344 |
| 2,857,950 A | 10/1958 | Tingley | |
| 3,046,827 A * | 7/1962 | Myers | 411/348 |
| 3,145,441 A | 8/1964 | Strandrud | |
| 3,202,038 A | 8/1965 | Bass | |
| 3,238,834 A * | 3/1966 | Appleberry | 411/347 |
| 3,534,650 A | 10/1970 | Kubokawa | |
| 4,722,649 A | 2/1988 | Ferguson | |
| 5,199,733 A * | 4/1993 | DeLorme | 280/515 |
| 5,429,464 A | 7/1995 | Eshraghi | |
| 5,975,822 A * | 11/1999 | Ruff | 411/553 |
| 6,224,309 B1 | 5/2001 | Yamamoto | |
| 6,893,184 B2 * | 5/2005 | Mills et al. | 403/322.2 |
| 7,153,074 B2 * | 12/2006 | Wei | 411/21 |

FOREIGN PATENT DOCUMENTS

| DE | 36 26 052 A1 | 2/1987 |
|---|---|---|
| GB | 2297595 A | 8/1996 |

\* cited by examiner

*Primary Examiner*—Flemming Saether
(74) *Attorney, Agent, or Firm*—Alston & Bird LLP

(57) ABSTRACT

A retractable fastener device and method for facilitating the fastening of multiple objects are provided. The retractable fastener may extend through an aperture defined in at least one component having a first side and a second side and further includes a tab device that may be extended and/or retracted so as to selectively prevent the retractable fastener device from being removed from the aperture through the first side.

1 Claim, 25 Drawing Sheets

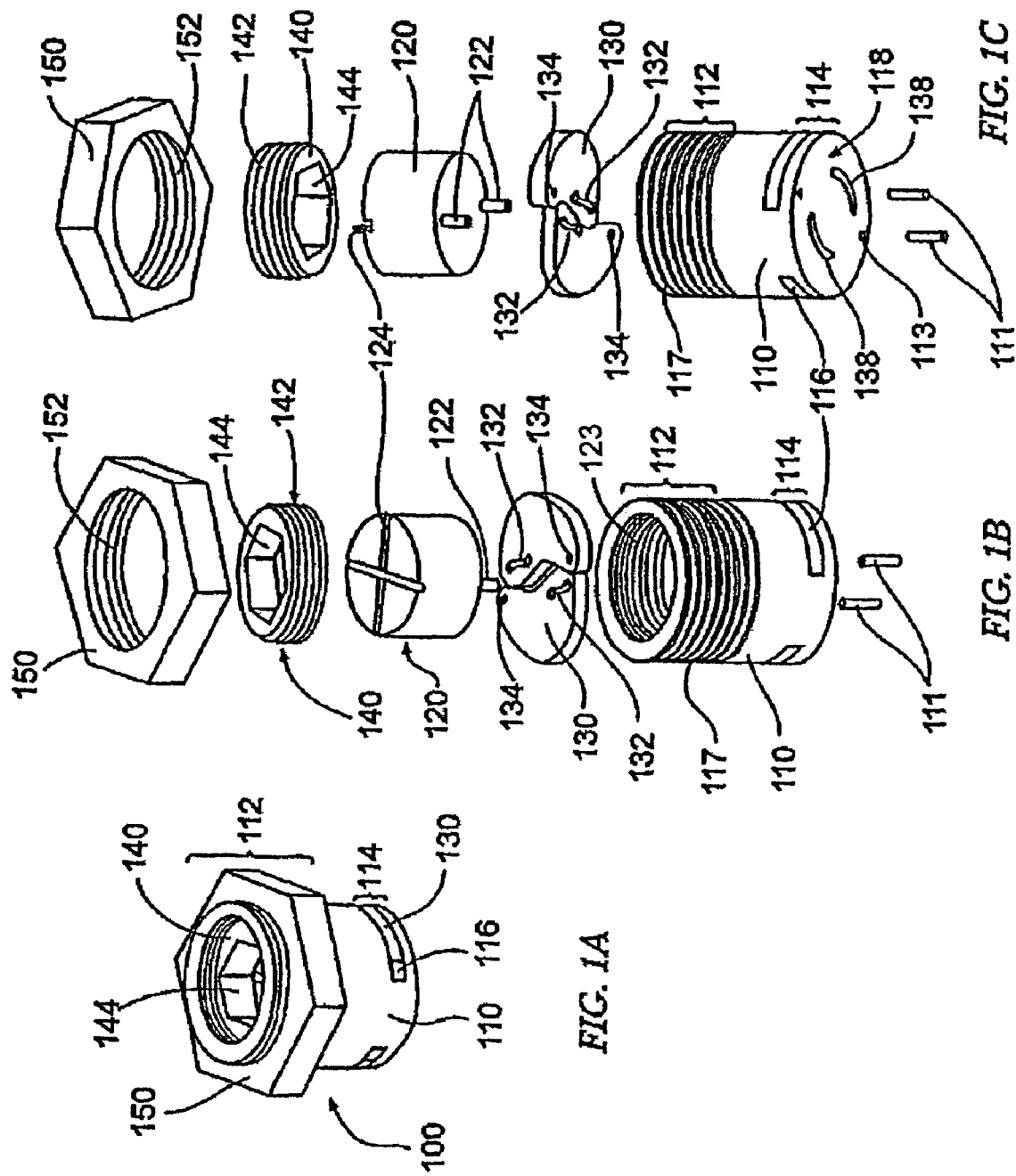

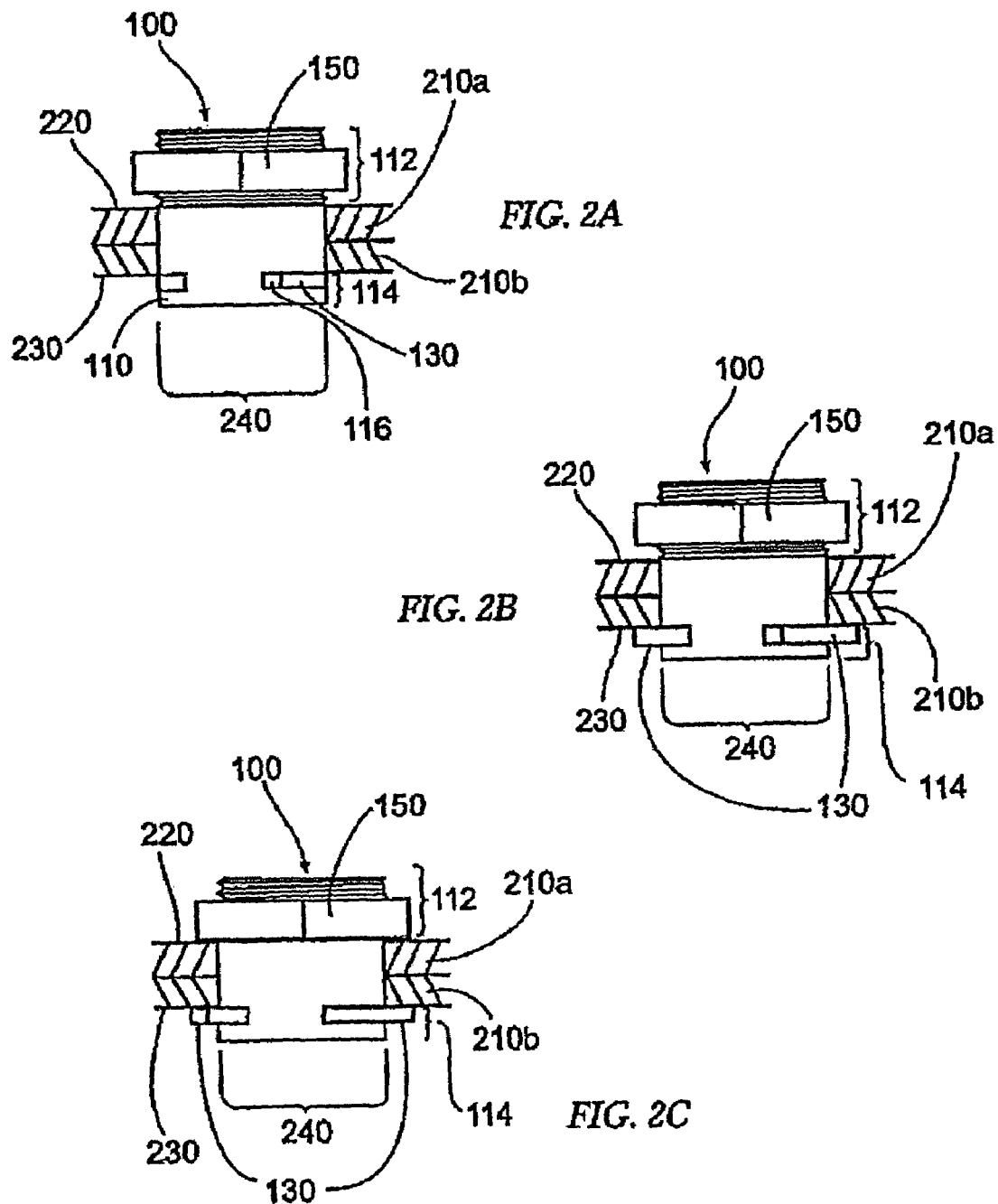

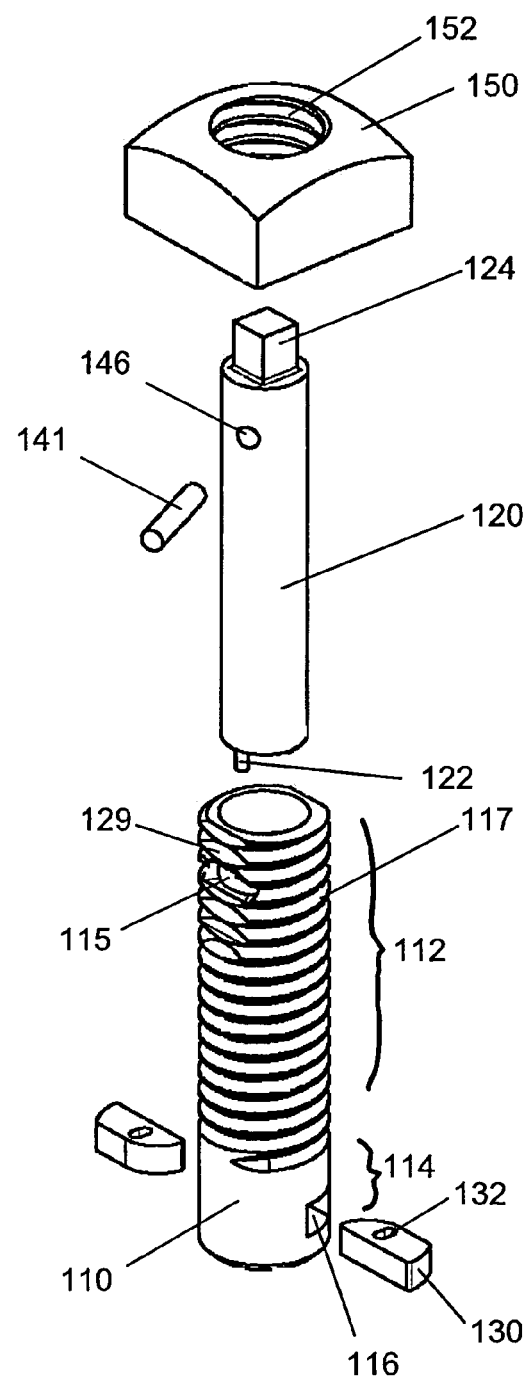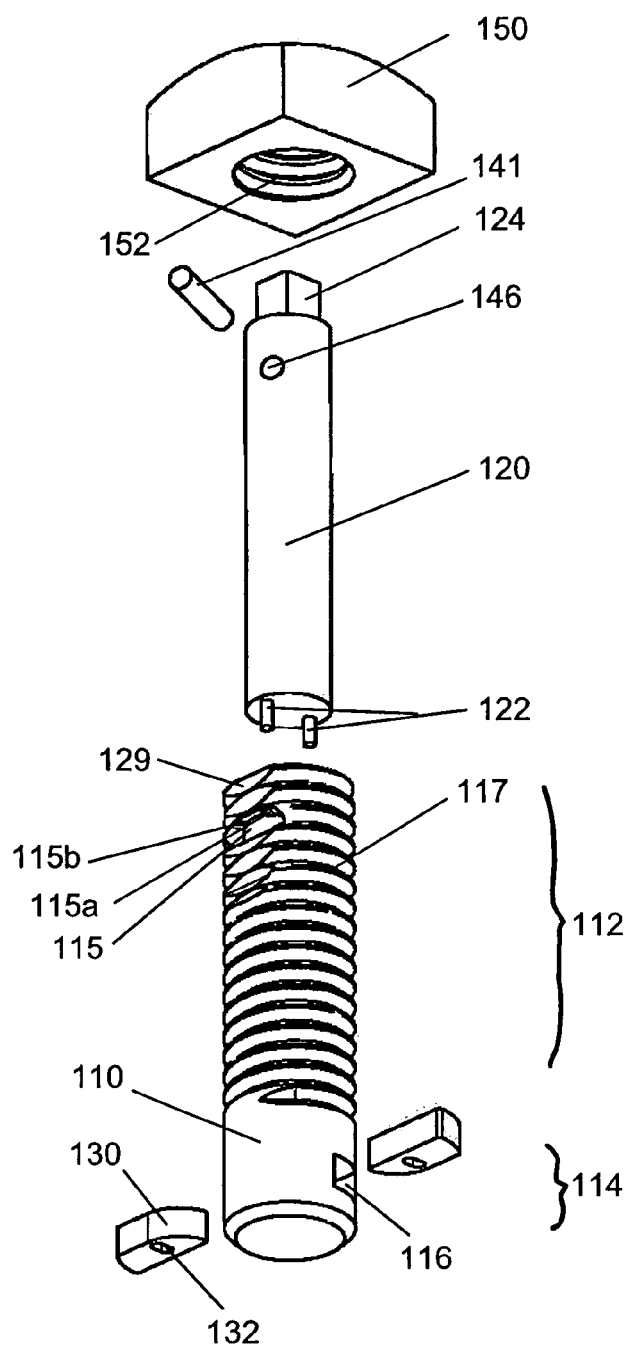
*FIG. 10*      *FIG. 11*

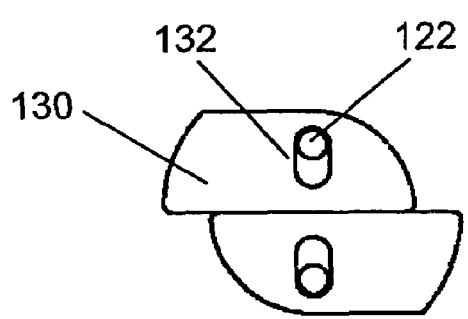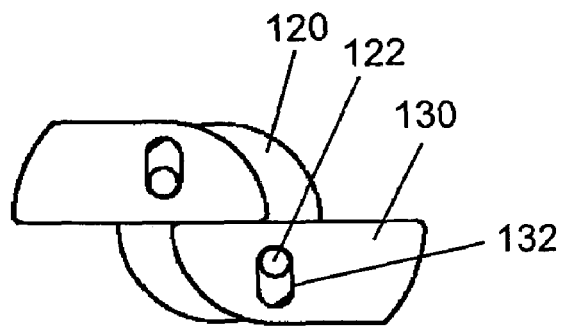
*FIG. 13A*  *FIG. 13B*

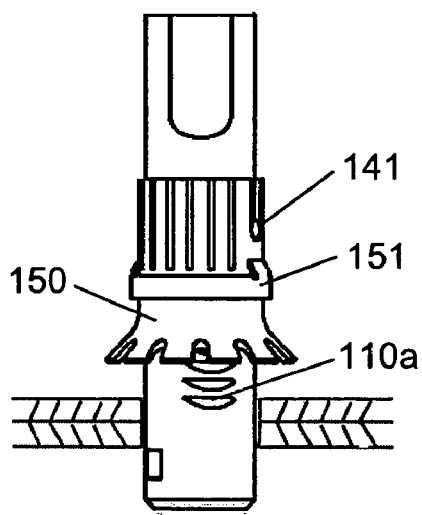
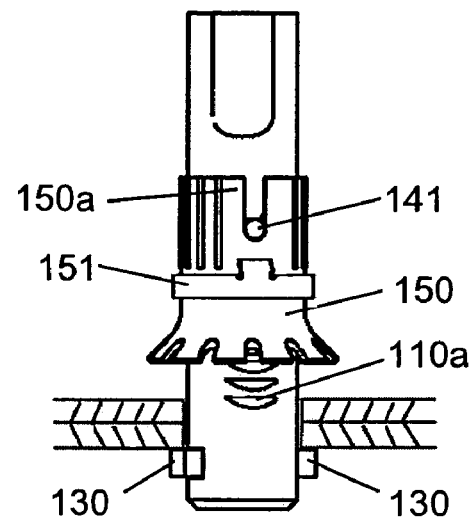
*FIG. 18A*  *FIG. 18B*
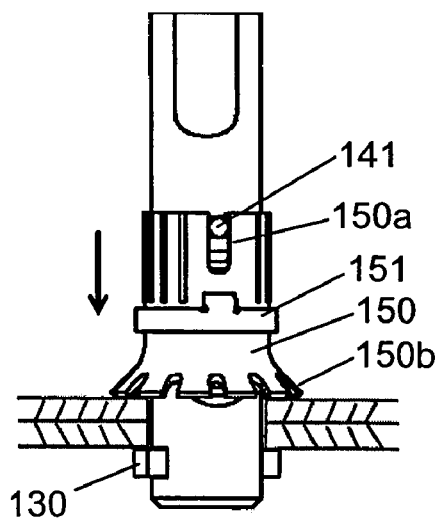
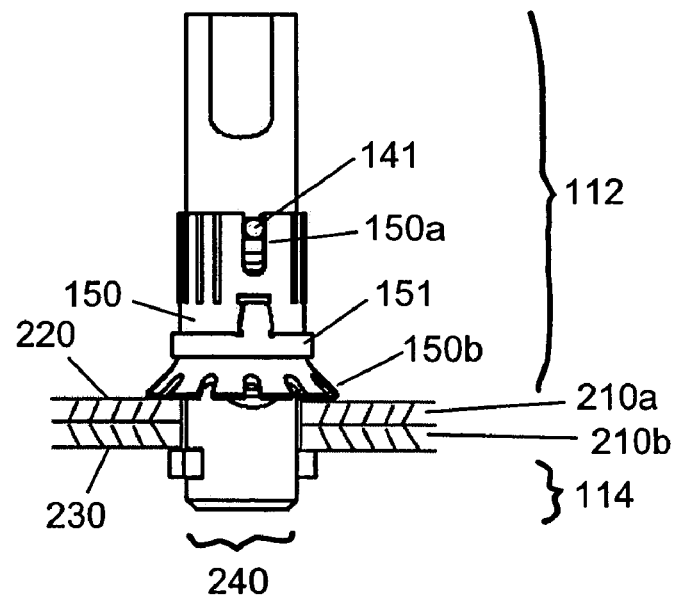
*FIG. 18C*  *FIG. 18D*

RETRACTABLE FASTENER DEVICE AND METHOD FOR FACILITATING THE FASTENING OF MULTIPLE OBJECTS

CROSS-REFERENCE TO RELATED APPLICATIONS

This application is a continuation-in-part of U.S. patent application Ser. No. 10/903,776, filed on Jul. 30, 2004, now U.S. Pat. No. 7,153,074 which is hereby incorporated herein in its entirety by reference.

FIELD OF THE INVENTION

The present invention relates generally to fastener devices adapted to extend through a common aperture defined in at least one component, and specifically, providing a retractable fastener that may extend through an aperture defined in at least one component from a first side to a second side and then be selectively retained therein via the actuation of a tab device extending laterally outward from the retractable fastener on the second side. More particularly the retractable fastener device and method of the present invention may allow the retractable fastener to be selectively removed from the aperture by retracting the tab device and pulling the retractable fastener towards the first side.

BACKGROUND OF THE INVENTION

Specialty fasteners such as blind fasteners are sometimes used to extend through an aperture defined in a sheet material that has a first side and a second side. Such fasteners typically extend through the aperture and are then actuated from the first side so as to expand and engage the second side of the sheet material such that the blind fastener may be secured within the aperture. These fasteners are also often used to affix two or more sheet materials together wherein one side of the materials is not readily accessible.

Some types of removable blind fasteners are also known for affixing two sheet metal layers having a first side and a second side wherein the fastener may be inserted through an aperture so as to affix the two sheet metal layers. For example, U.S. Pat. No. 2,857,950 to Tingley (the '950 patent) discloses a removable blind fastener with pivoted securing legs wherein the legs may be pivoted with respect to a body of the blind fastener so as to engage a second side of two layers of sheet metal. However, the '950 patent requires that the pivoted securing legs be secured to the second side by the use of additional bolts that must be inserted through the sheet metal layers to engage the pivoted securing legs with the second side. In addition, the '950 patent requires that the legs be pivoted into contact with the second side via wires having crimped ends to engage the pivoted leg through which it passes. Thus, the retractable blind fastener requires the actuation of the wires to engage the pivoted legs with the second side as well as the installation of at least two separate bolts to secure the pivoted legs to the second side.

Another type of blind fastener includes a "push-type" fastener that also may be removable and reusable. Such push-type fasteners may include a sleeve into which is slid a push bolt such that the blind fastener may be installed and removed by hand, without the use of any tools. For instance, U.S. Pat. No. 3,202,038 to Bass (the '038 patent) discloses a push-type blind fastener including a sleeve into which is slidably engaged a push bolt having a single annular locking and releasing groove defined therein. The push bolt may be pushed to a first position so as to engage a resilient locking and securing tab that are attached to the sleeve and resiliently biased inwardly with respect to the sleeve. In the first position, the push bolt may be positioned so as to urge the resilient locking and securing tabs laterally outward so as to engage an inaccessible surface of a workpiece so as to secure the sleeve with respect to an aperture defined in the workpiece. Further, the blind fastener of the '038 patent also provides that the push bolt may be pushed to a second position such that the annular locking and securing groove becomes aligned with the resilient locking and securing tabs so that they may return to their inwardly biased position with respect to the sleeve, thereby releasing their engagement with the inaccessible surface of the workpiece and allowing the sleeve (and blind fastener) to be removed completely from the aperture. While the blind fastener of the '038 patent is easily actuated without the use of tools, it also allows the blind fastener to be easily removed by the movement of the push bolt to the second position, and thus the blind fastener may be inadvertently removed when its removal is not desired. In addition, the resilient locking and securing tabs of the blind fastener of the '038 patent may experience fatigue such that the securing tabs may eventually lose their resilient inward bias such that the blind fastener may be rendered non-removable after repeated use. Also, the blind fastener of the '038 patent does not allow for adjustment of the distance between the resilient locking and securing tabs and a head of the blind fastener, and as such, the blind fastener may only securely and properly engage a workpiece having a single fixed thickness that is equivalent to the distance between the resilient locking and securing tabs and a head of the blind fastener.

Other types of blind fasteners may provide spring mechanisms for engaging the inaccessible side of one or more sheet materials through an aperture. While such spring mechanisms may provide a quick engagement with the inaccessible side, they also lack a mechanism for recoiling the spring mechanism. Thus, such spring mechanism blind fasteners may not be removable via the aperture once they are engaged with the inaccessible side. For instance, U.S. Pat. No. 4,722,649 (the '649 patent) to Ferguson describes a releasable fastening device for securing workpieces together, and includes an expandable device in the form of a stiff spring located within an annular recess in a shank of the fastening device. Furthermore, the '649 patent discloses a mechanism which releasably engages the spring and is capable of limiting the spring's extension to within the annular recess until such time as the fastener is inserted into an aperture defined in one or more workpieces. Once inserted, the mechanism may release the spring so that it may engage a bottom surface of a lower workpiece so as to secure the fastener within the aperture. The '649 patent's release mechanism, however, provides no mechanism for recoiling the spring, such that once the blind fastener is engaged with the bottom surface of the lower workpiece it may not be easily removed without damaging either the fastener or the workpiece. The releasable fastening device of the '649 patent also does not provide for the adjustment of the distance between the spring and a head of the fastening device such that the blind fastener may only securely engage sheet materials having a fixed thickness.

Other types of blind fasteners have been disclosed which may extend through an aperture defined in a material and be capable of engaging an inaccessible side of the material by actuating a mechanism on the accessible side of the blind fastener that acts to deform a portion of the blind fastener extending through the aperture to the inaccessible side of the material. For instance, U.S. Pat. No. 5,429,464 to Eshraghi (the '464 patent) discloses a blind fastener having a fastener body extending through an aperture defined by one or more workpieces. The body has a stem passing therethrough such that the stem may be pulled away from the workpieces from the first side in order to pull an anvil washer and an expander collar into the body so as to laterally expand and bulb the fastener body on the second side of the workpieces. Similarly, U.S. Pat. No. 6,224,309 to Yamamoto (the '309 patent) discloses a blind fastener having a hollow bolt for extending through an aperture defined by a workpiece. The blind fastener of the '309 patent also includes a threaded core bolt and a "pull up nut" engaged with the core bolt such that as the core bolt is turned within the hollow bolt, the pull up nut is "pulled up" into contact with the body portion of the hollow bolt so as to deform the body portion such that the deformed body portion engages the inaccessible side of the workpiece. In both the '464 and '309 patents, the blind fasteners may be actuated from the accessible first side of a workpiece so as to deform an inaccessible portion of the blind fastener. Both of these fasteners, however, require the deformation of a sleeve or body portion in order to engage an inaccessible side of the workpiece. Once deformed, however, these blind fasteners may not be easily removable without damaging one or more of the workpieces. In addition, once deformed, these blind fasteners may not be reusable.

Another type of blind fastener includes a spring-biased actuator pin and at least one pivotable toggle that also may be removable and reusable. For instance, U.S. Pat. No. 3,534,650 to Kubokawa (the '650 patent) discloses a fastener device having an adjustable length and including a sleeve into which is slidably engaged an actuator pin connected with four toggle wings and biased by a spring. In the device of the '650 patent, one or more apertured workpiece members are held together by tightening a lock nut against the extended toggle wings after having inserted the fastener through the workpiece members. The device of the '650 patent does not provide stop means for selectively maintaining the toggle wings in their retracted and extended positions. This limitation makes the device of the '650 patent unsuitable for applications wherein selective control of the toggle wings is essential, examples of such applications include using the fastener as a detent pin, wherein the fastener would hold the workpiece members together without exerting a compressive force between the lock nut and the extended toggle wings, and using the fastener in cases where the user must insert the fastener through the aperture without causing the toggle wings to exert a compressive force against the aperture's wall lining while the actuator pin is not actuated. The device of the '650 patent also does not provide a conduit configuration to allow for communication between the accessible and inaccessible sides of the workpiece members. In addition, the device of the '650 patent requires a relatively large clearance on the inaccessible side of the workpiece members because the extension of the toggle wings is achieved by pivoting the four toggle wings longitudinally outward with respect to four corresponding lock pins installed laterally through the annulus of the sleeve.

Therefore, there exists a need for a retractable fastener device that is capable of extending through an aperture defined in at least one component having a first side and a second side and selectively and retractably engaging the second side so as to selectively prevent the fastener device from being removed from the aperture from the first side. In addition, there further exists a need for a retractable fastener device that is relatively easy to manufacture, simple to install, able to firmly engage a first side and a second side of at least one component, robust, and reusable. There also exists a need for a retractable fastener device that may be easily adjusted to be secured within an aperture defined in at least one component wherein the at least one component may have a varied thickness. There further exists a need for a retractable fastener device having a conduit configured to allow for communication between the first side and the second side of the at least one component when the retractable fastener device is selectively engaged with the second side of the at least one component.

SUMMARY OF THE INVENTION

The embodiments of the present invention satisfy the needs listed above and provide other advantages as described below. The fastener device of the present invention provides a sleeve adapted to extend through an aperture defined by at least one component having a first side and a second side. Further, a first portion of the sleeve is configured to extend from the aperture on the first side, while a second portion of the sleeve is configured to extend from the aperture on the second side. The fastener device also comprises an actuator device operably engaged with the first portion of the sleeve and configured to be actuated from the first side and a tab device operably engaged with the second portion of the sleeve and capable of operably engaging the actuator device. Thus, the tab device may be responsive to the actuator device as the actuator device is actuated so as to extend the tab device substantially laterally outward from the second portion of the sleeve such that the tab device thereby cooperates with the actuator device so as to become selectively engaged with the second side of the at least one component.

According to some embodiments, the actuator device further comprises a slug disposed at least partially within the sleeve such that the slug is configured to be capable of rotating with respect to an inner surface of the sleeve, and wherein the slug has at least one pin extending therefrom toward the second portion of the sleeve defining a slit. Thus, the tab device may be disposed within the sleeve and may be capable of operably engaging the at least one pin. The tab device may be responsive to the at least one pin as the slug is rotated such that the tab device may extend laterally outward through the slit to an extended position as the slug is rotated in a first direction, and such that the tab device may retract laterally inward through the slit to a retracted position as the slug is rotated in a second direction. Thus, the tab device may cooperate with the slug so as to selectively prevent the sleeve from being removed from the aperture through the first side. Therefore, the slug may be used to selectively actuate the tab device to selectively engage the second side of the at least one component. According to some embodiments, the slug may be configured to be capable of rotating less than about one half turn with respect to the inner surface of the sleeve in order to extend the tab device from the retracted position to the extended position. The slug may be further configured to be capable of rotating about one quarter turn with respect to the inner surface of the sleeve in order to extend the tab device from the retracted position to the extended position.

According to other embodiments, fastener device of the present invention may further comprise a plug device disposed at least partially within the sleeve between the first side and the slug. The plug device may be configured to be capable of being tightened with respect to the slug so as to selectively prevent the slug from being removed from the sleeve through the first side. The fastener device may also further comprise a nut disposed at least partially around an outer surface of the first portion of the sleeve. Further, the nut may be configured to be capable of being tightened with respect to the first side so as to selectively prevent the sleeve from being removed from the aperture through the second side. In some embodiments, the slug of the fastener device of the present invention may further define a conduit extending through the slug so as to allow communication through the sleeve between the first side and the second side when the tab device is extended laterally outward through the slit.

The embodiments of the present invention also provide a method for facilitating the attachment of a fastener device comprising a sleeve to at least one component having a first side and a second side. The method may comprise the steps of: inserting the fastener device through an aperture defined by the at least one component such that a first portion of the sleeve extends from the aperture on the first side, and such that a second portion of the sleeve extends from the aperture on the second side; and expanding a tab device from a slit defined by the second portion of the sleeve so as to selectively prevent the sleeve from being removed from the aperture through the first side. According to other embodiments, the method may further comprise the step of tightening a nut disposed at least partially around an outer surface of the first portion of the sleeve such that the nut is secured with respect to the first side so as to selectively prevent the sleeve from being removed from the aperture through the second side. In some method embodiments, the expanding step may further comprise the step of rotating a slug disposed at least partially within the sleeve. The slug may further be operably engaged with the tab device so as to be further configured to be capable of expanding the tab device from the slit so as to selectively prevent the sleeve from being removed from the aperture through the first side.

Thus the various embodiments of the fastener device and method of the present invention provide many advantages that may include, but are not limited to: providing a retractable and selectively removable fastener device that is easily installed and removed from an aperture defined in at least one component, providing a fastener device that may be securely installed in an aperture defined in at least one component having a variable thickness, and allowing the fastener device to fully engage a second side of the at least one component using less than one half turn in order to actuate a tab device to engage the second side. Some embodiments of the fastener device and method of the present invention provide the added advantage of forming a conduit through the fastener device between a first side and a second side of the at least one component.

These advantages, and others that will be evident to those skilled in the art, are provided in the fastener device and method of the present invention.

BRIEF DESCRIPTION OF THE DRAWINGS

Figure 3B:
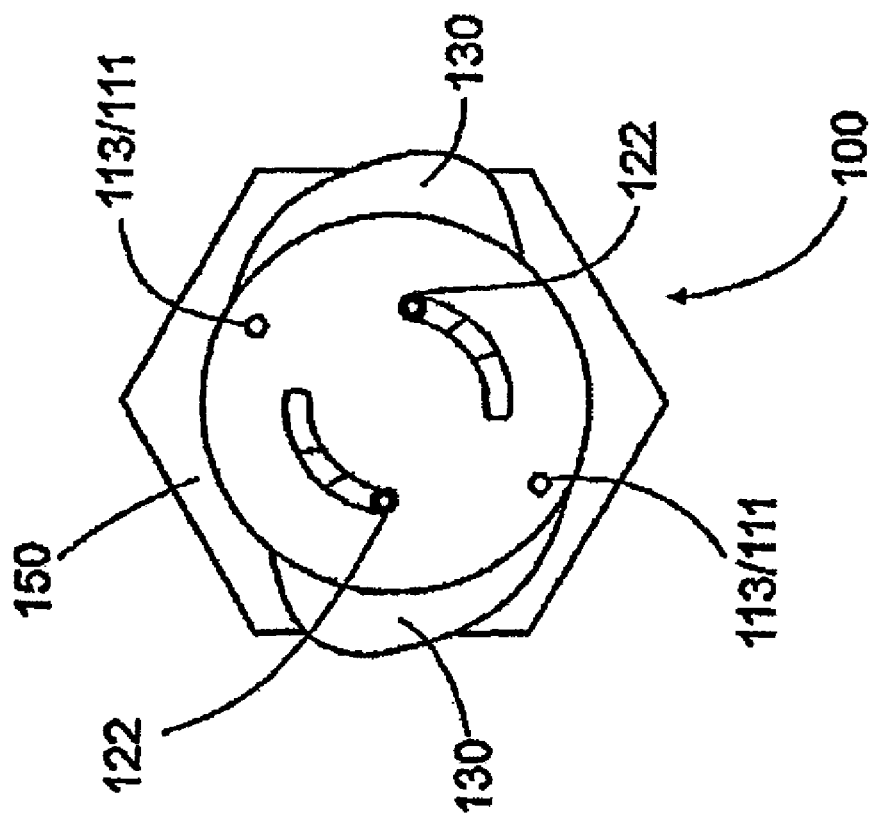
Figure 3A:
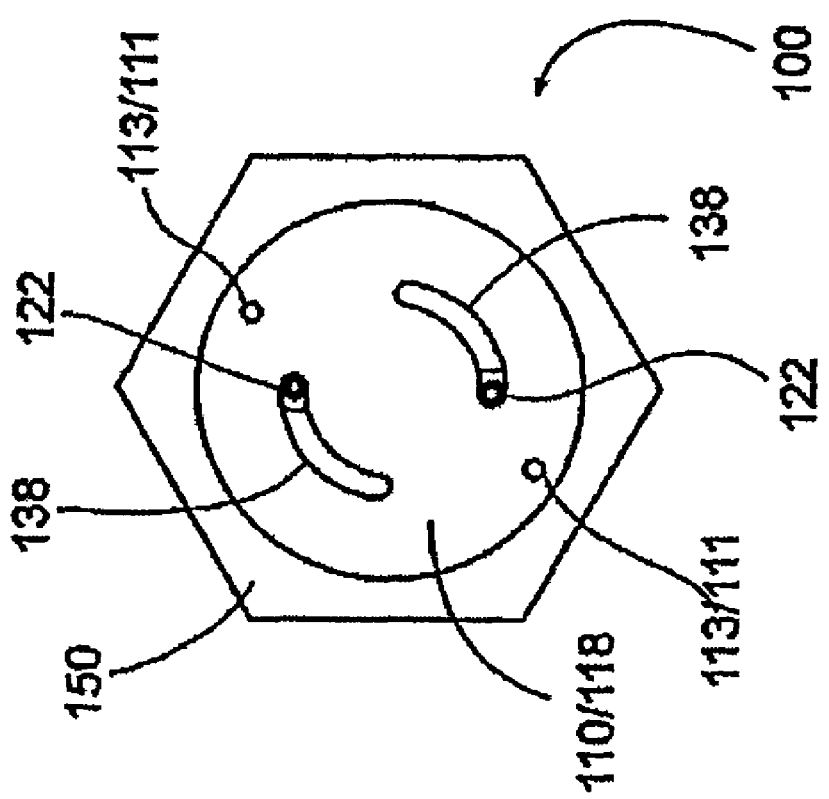
Figure 4B:
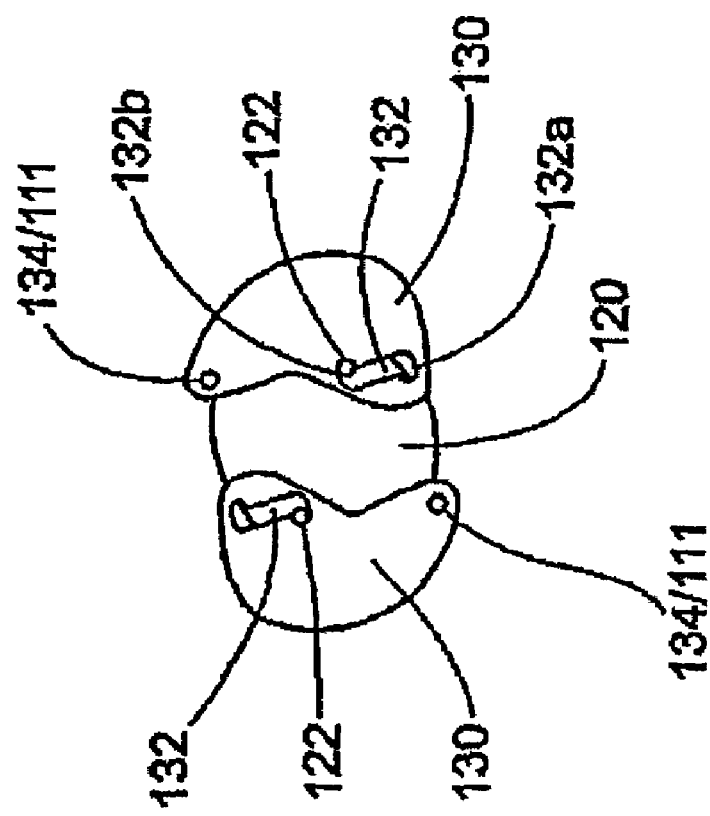
Figure 4A:
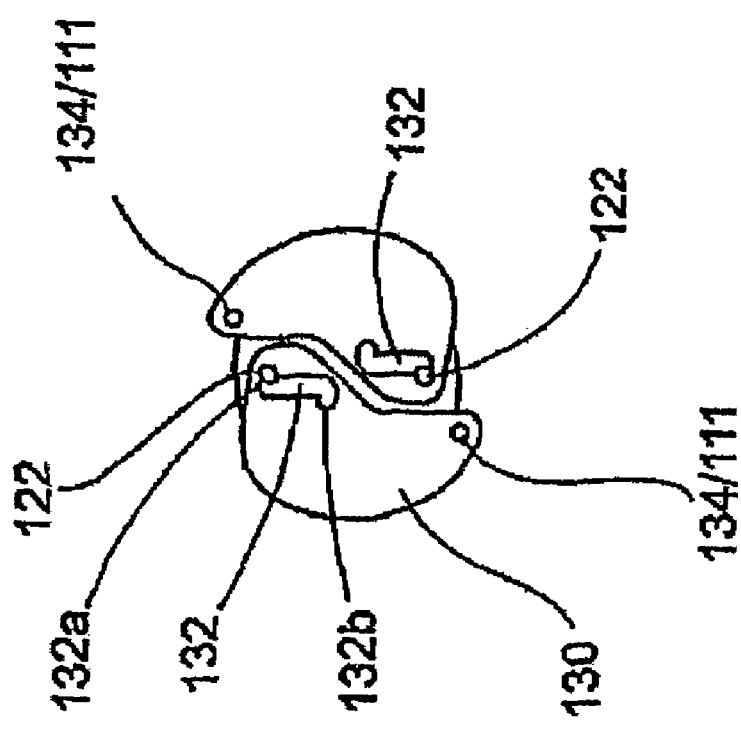
Figure 5:
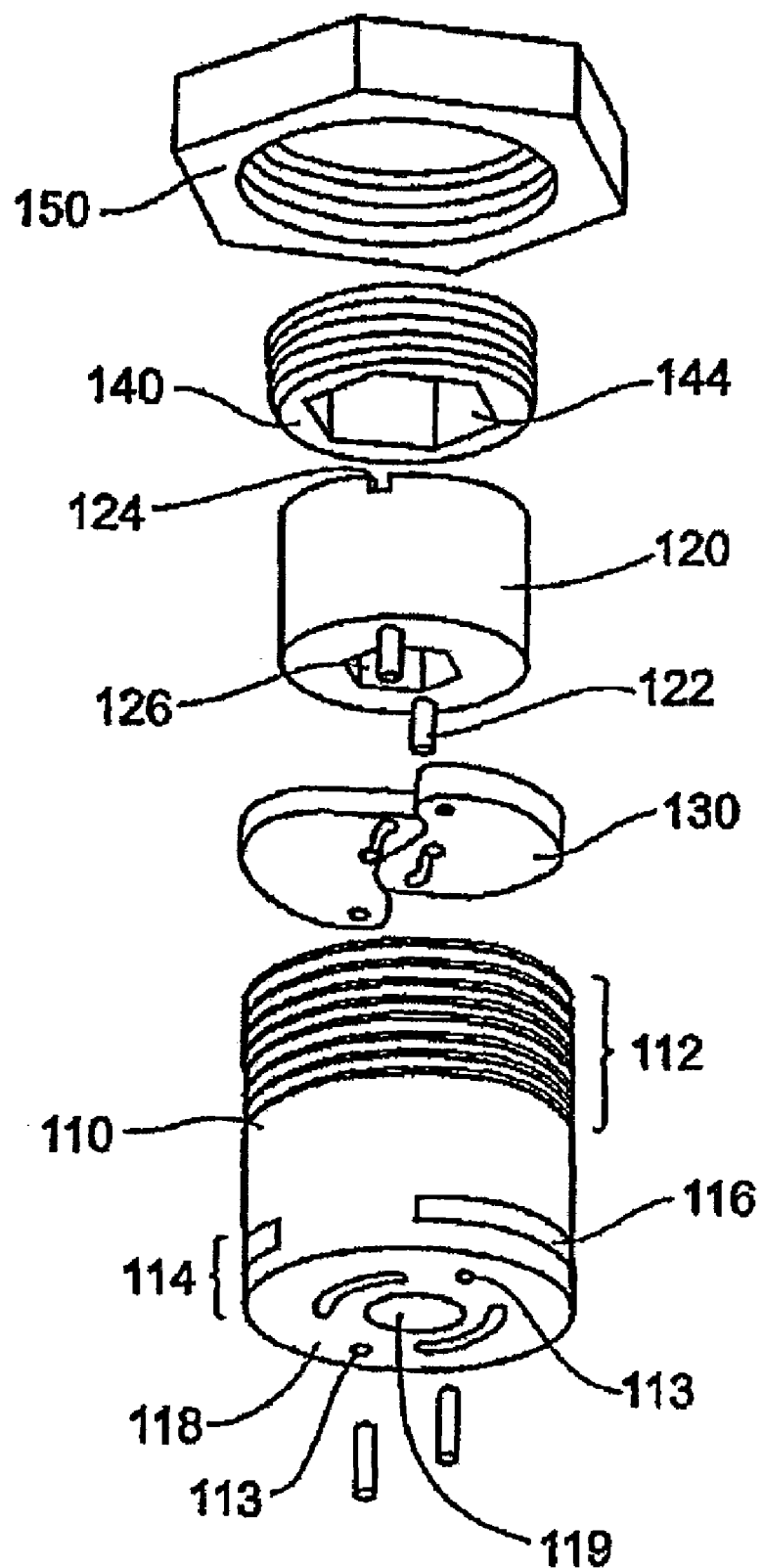
Figure 6:
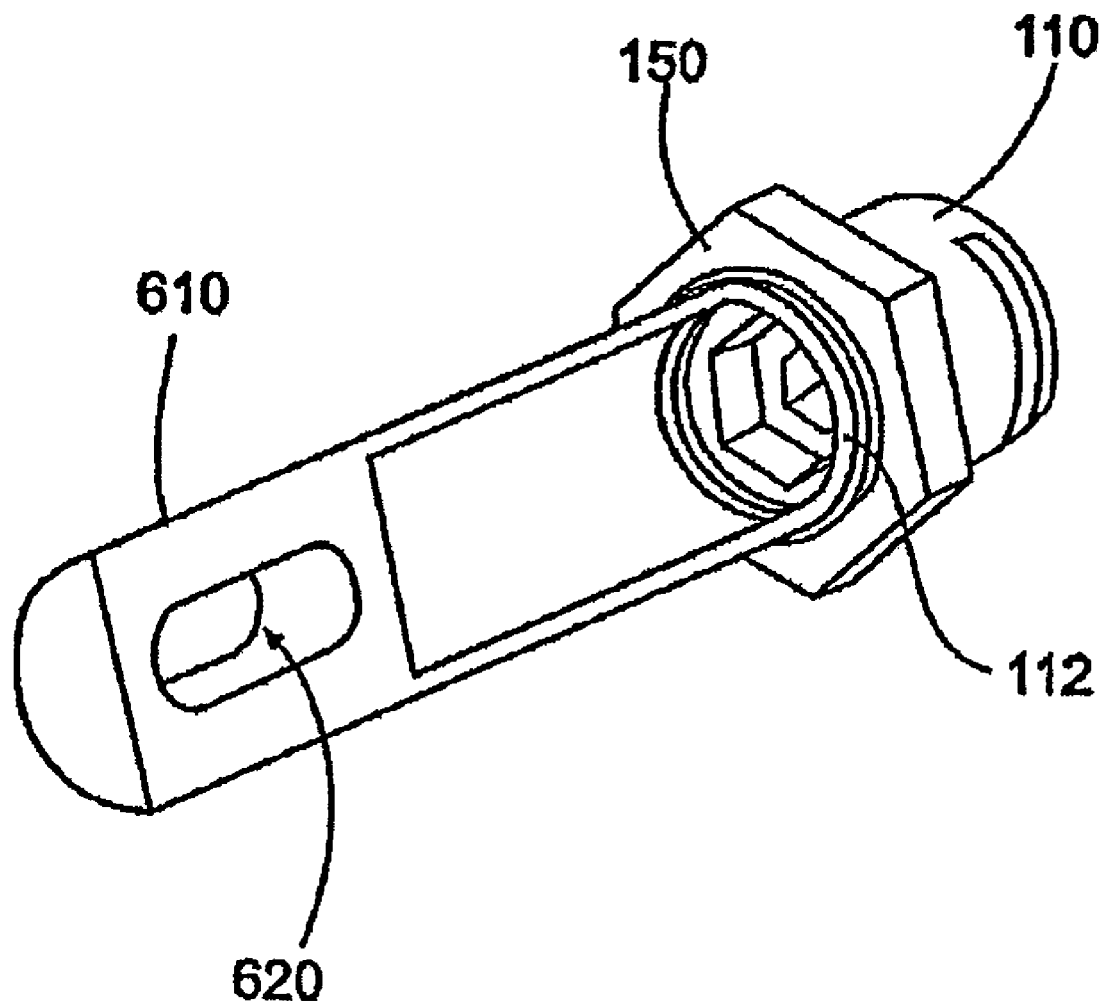
Figure 7:
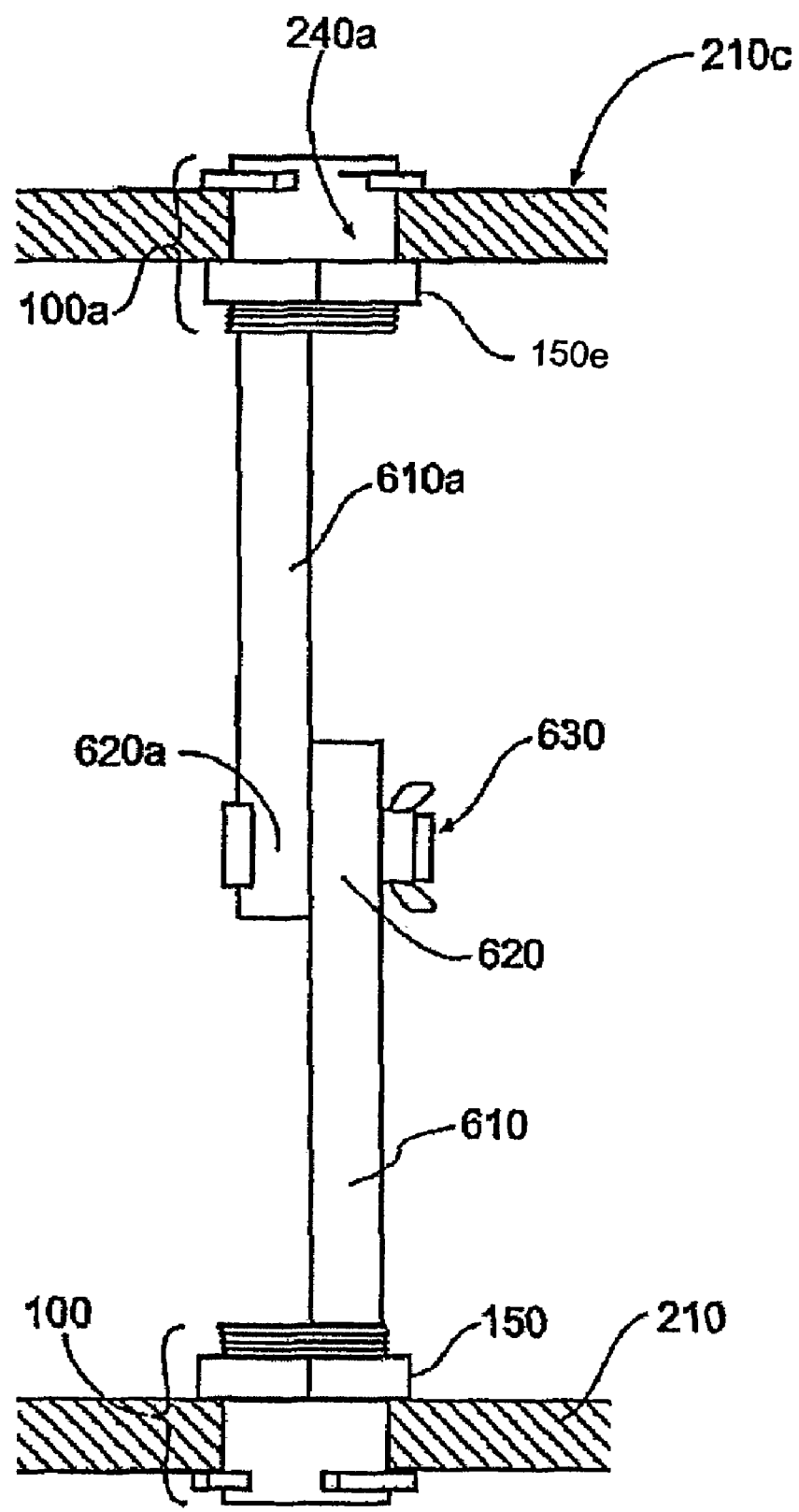
Figure 8:
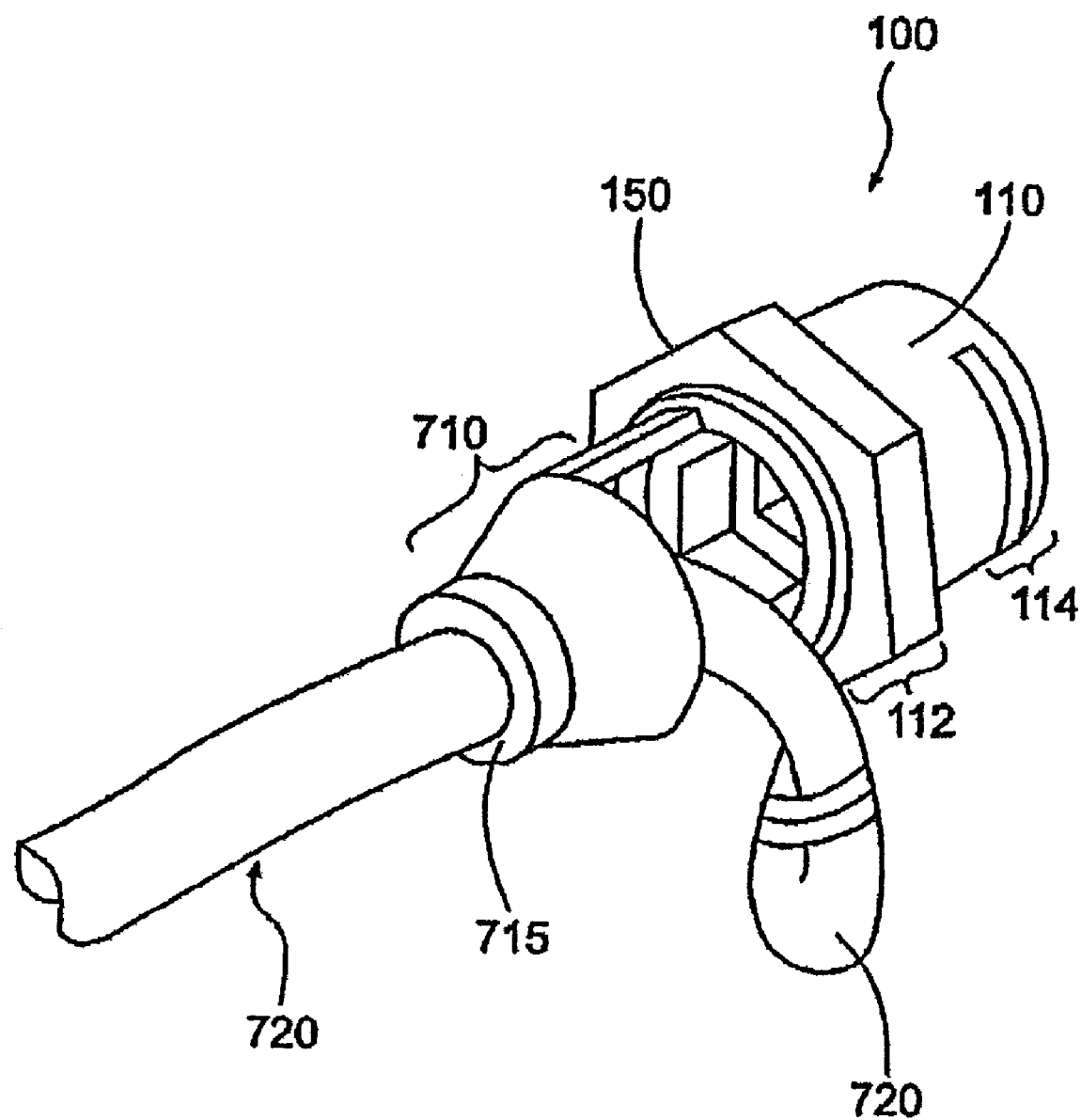
Figure 9:
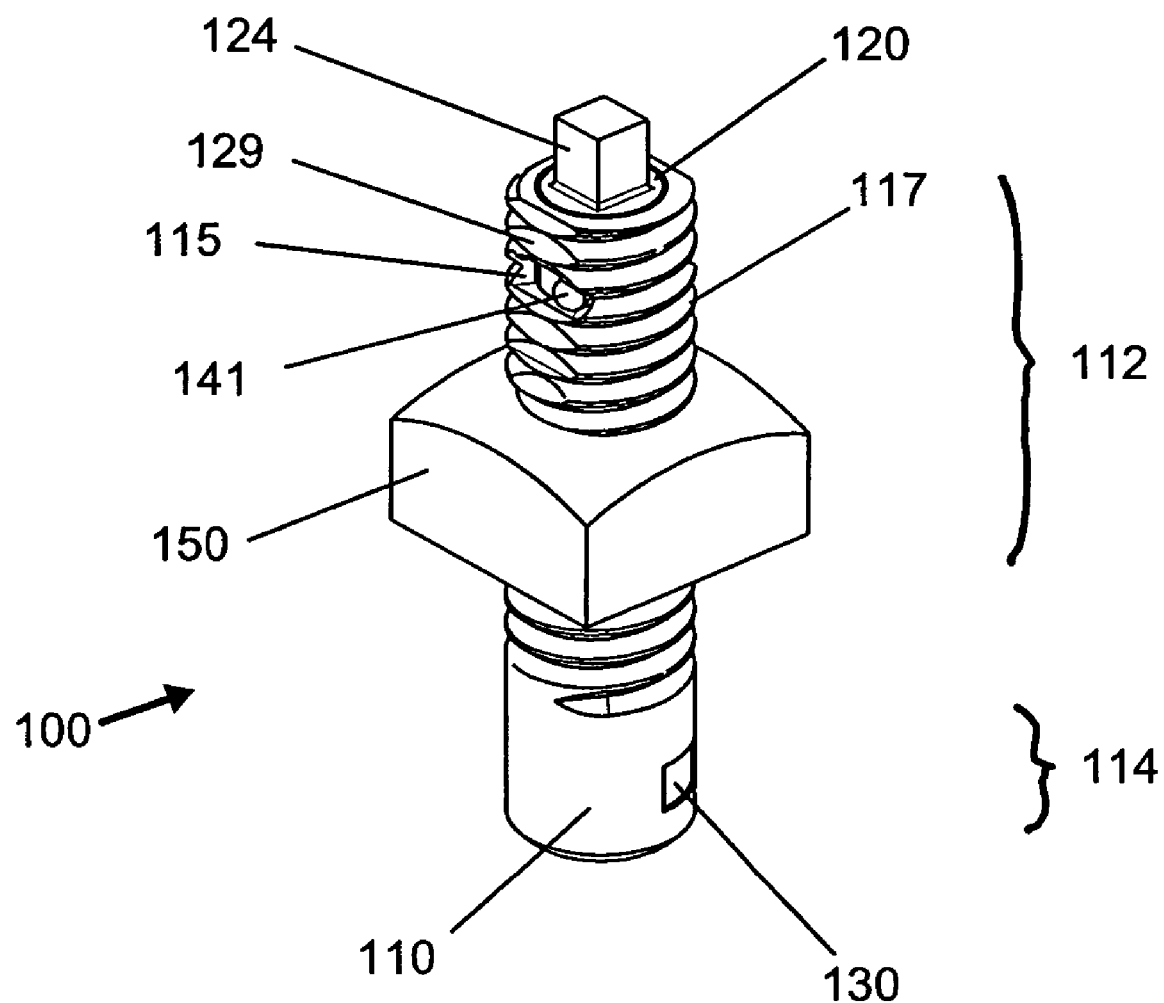
Figure 12A:
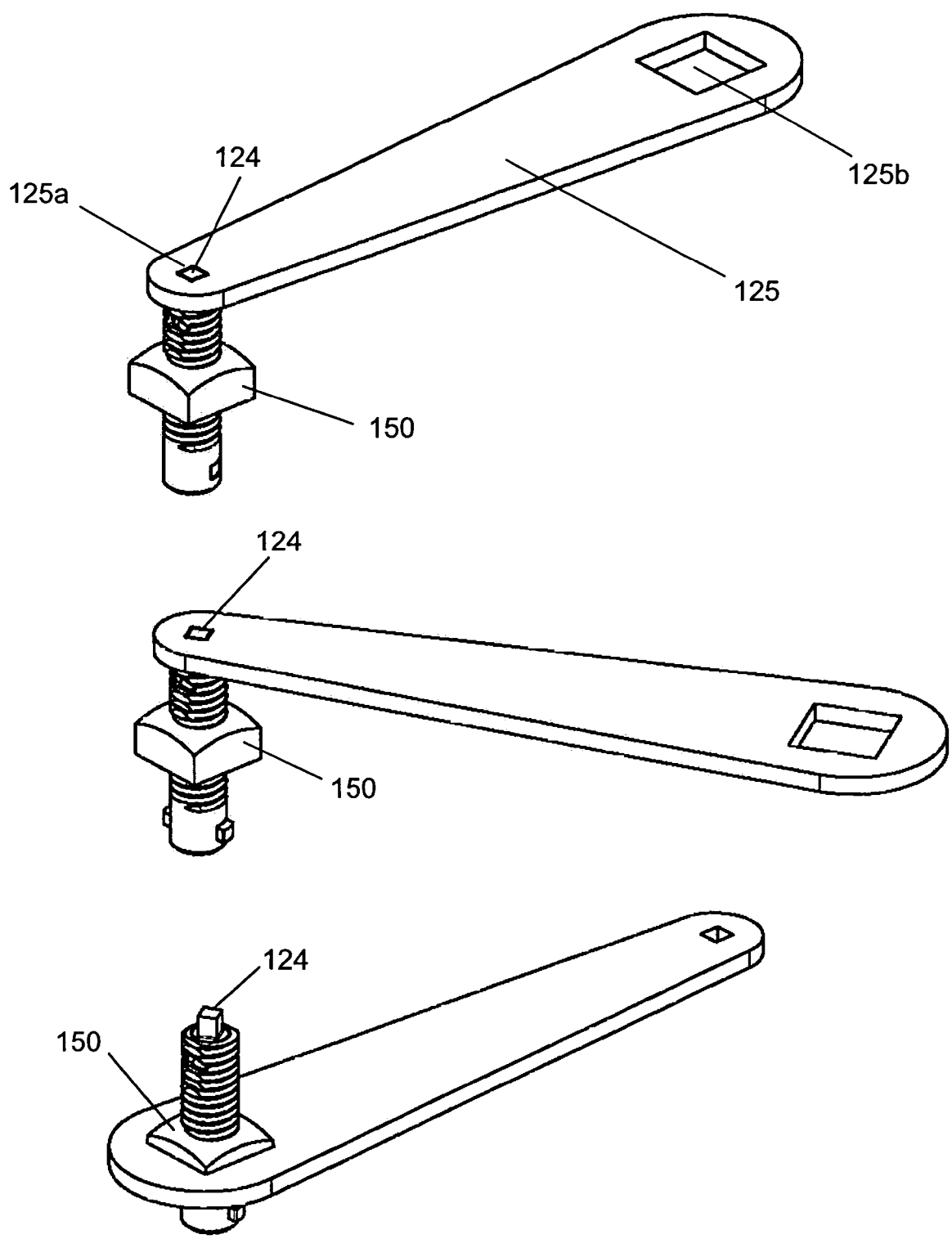
Figure 12B:
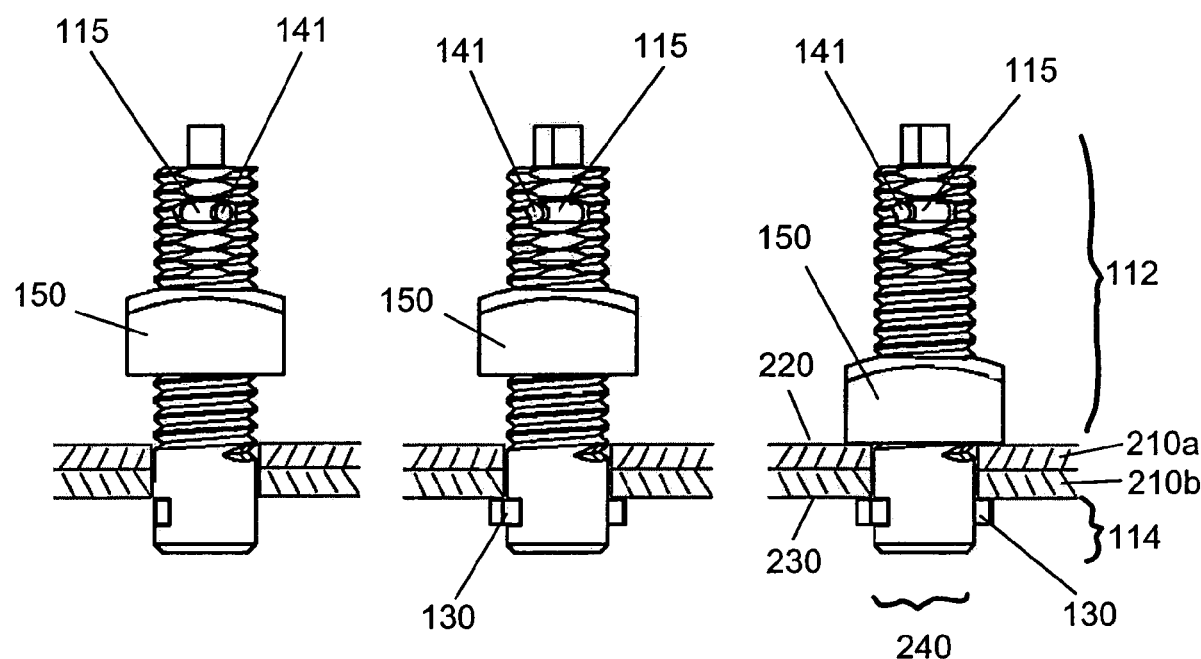
Figure 14A:
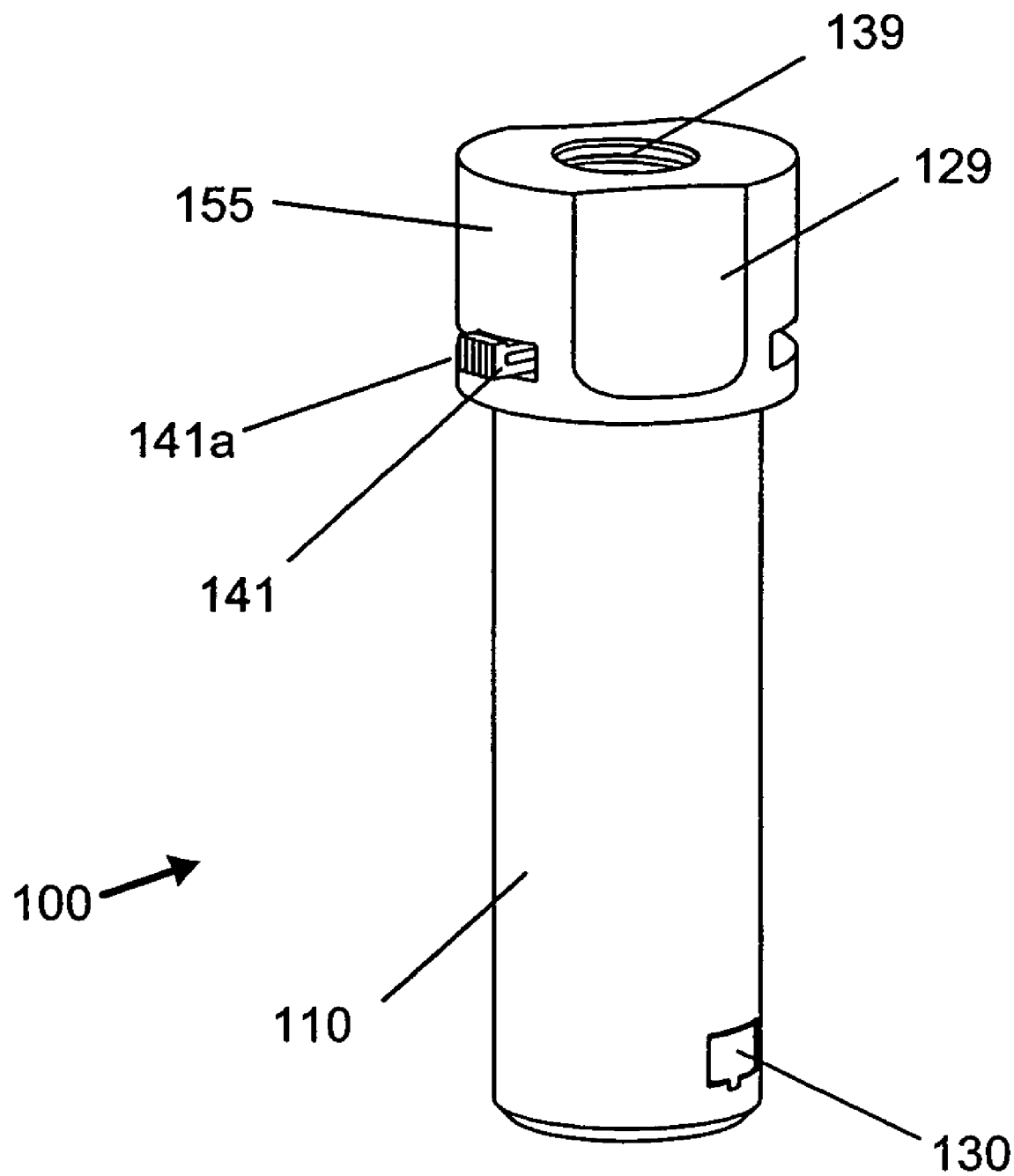
Figure 14B:
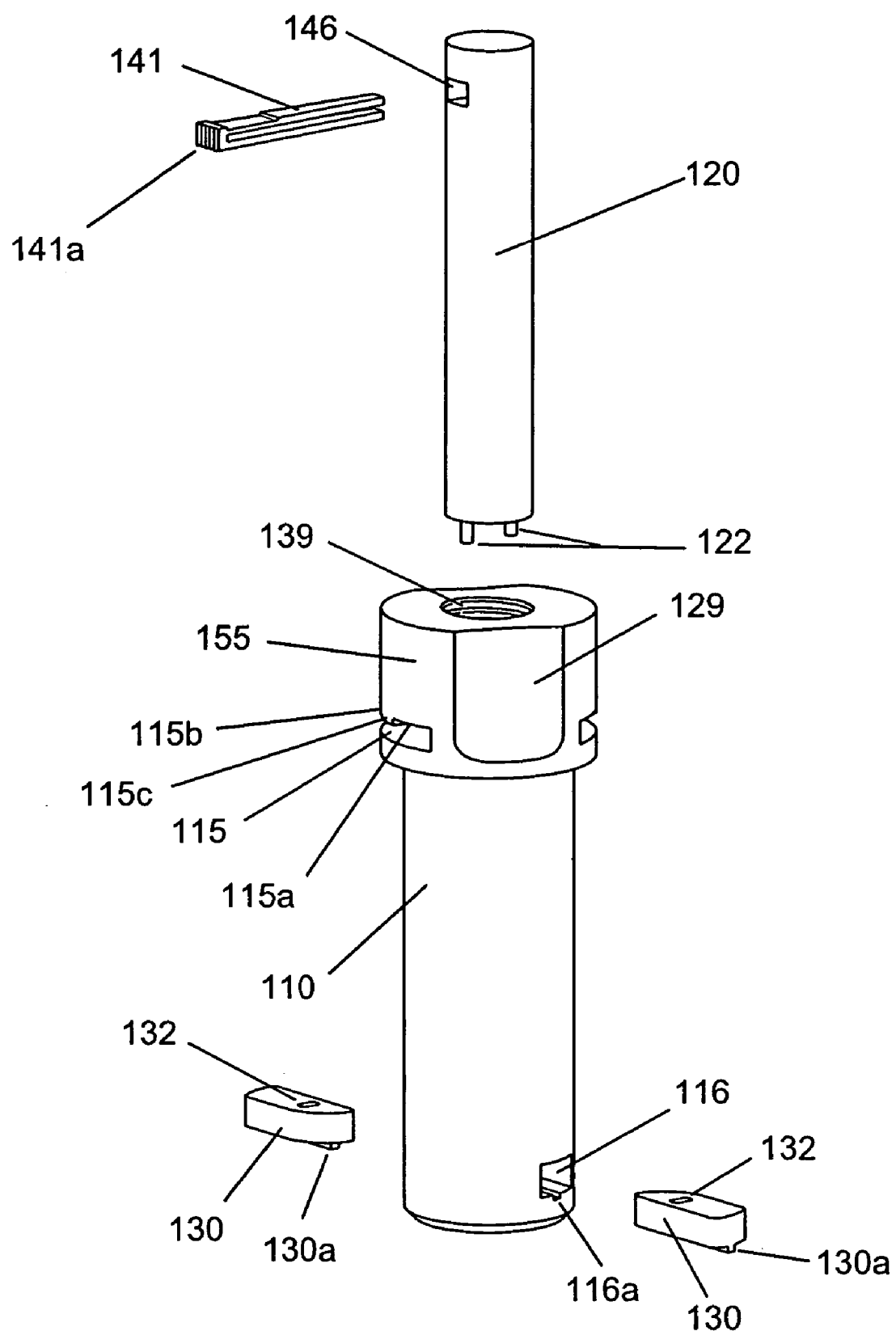
Figure 15A:
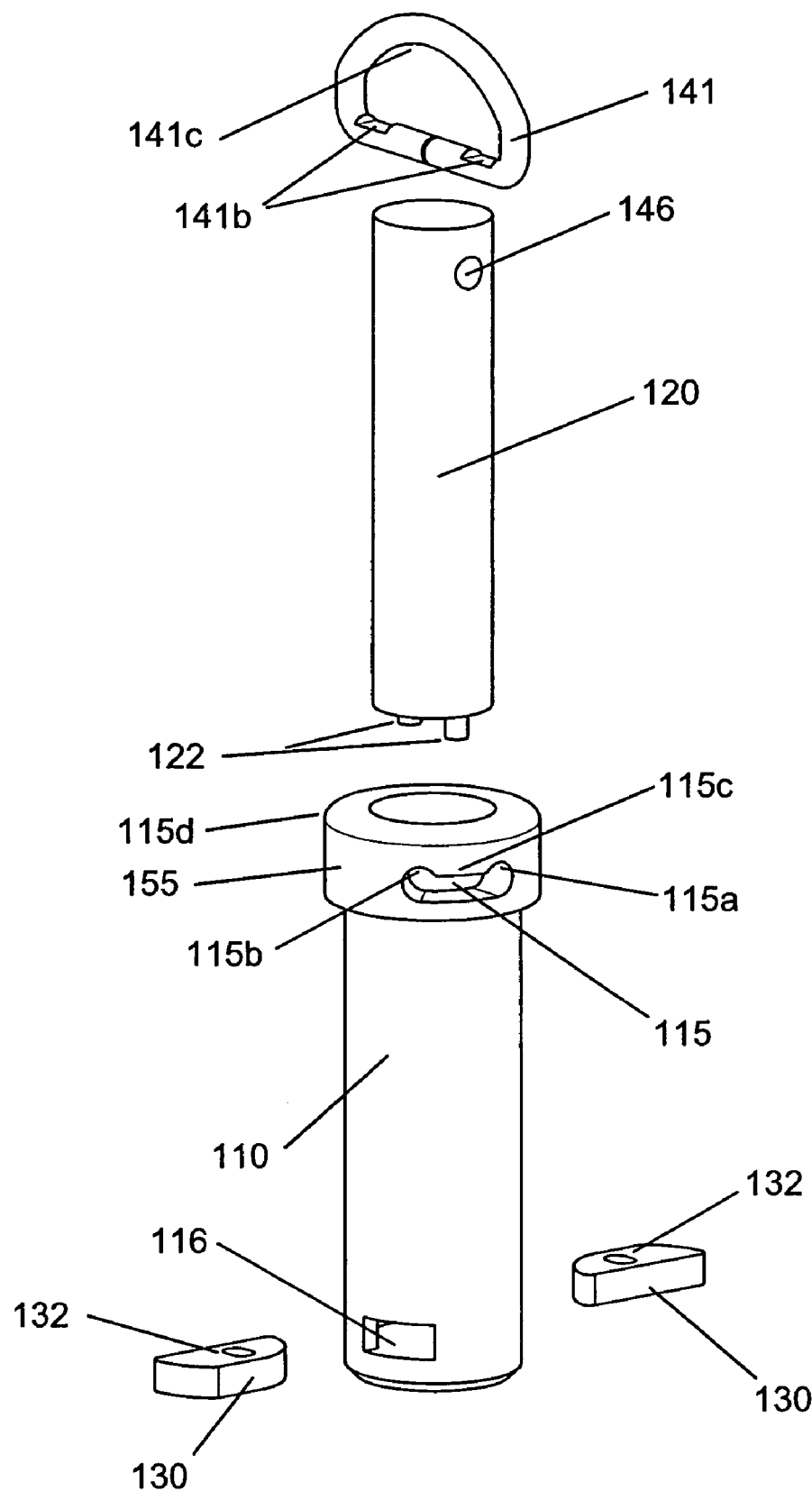
Figure 15B:
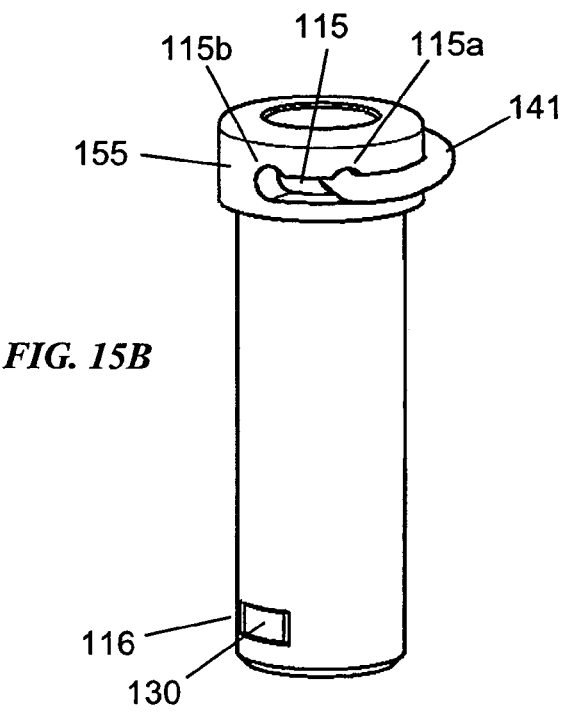
Figure 15C:
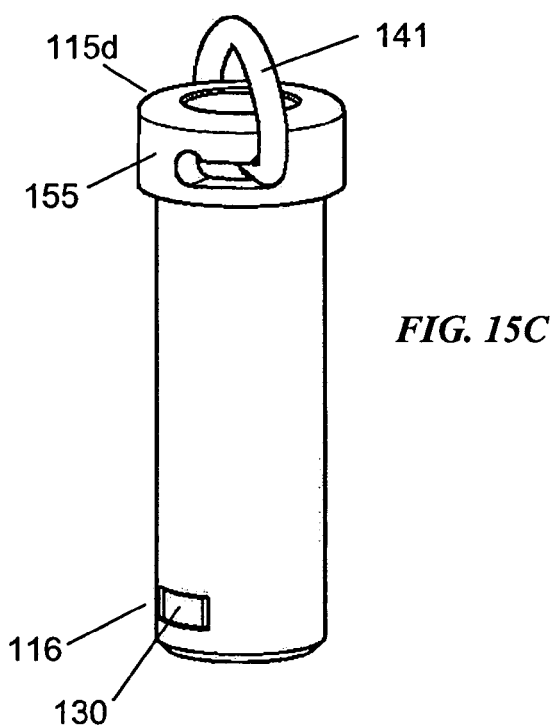
Figure 15D:
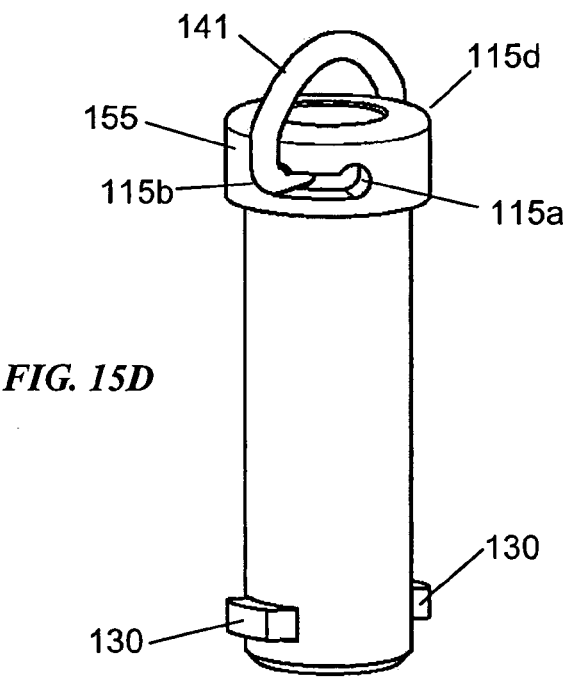
Figure 15E:
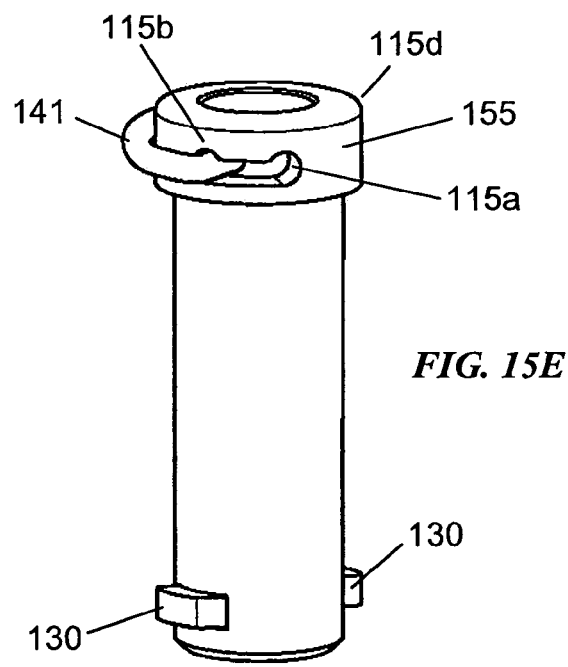
Figure 16A:
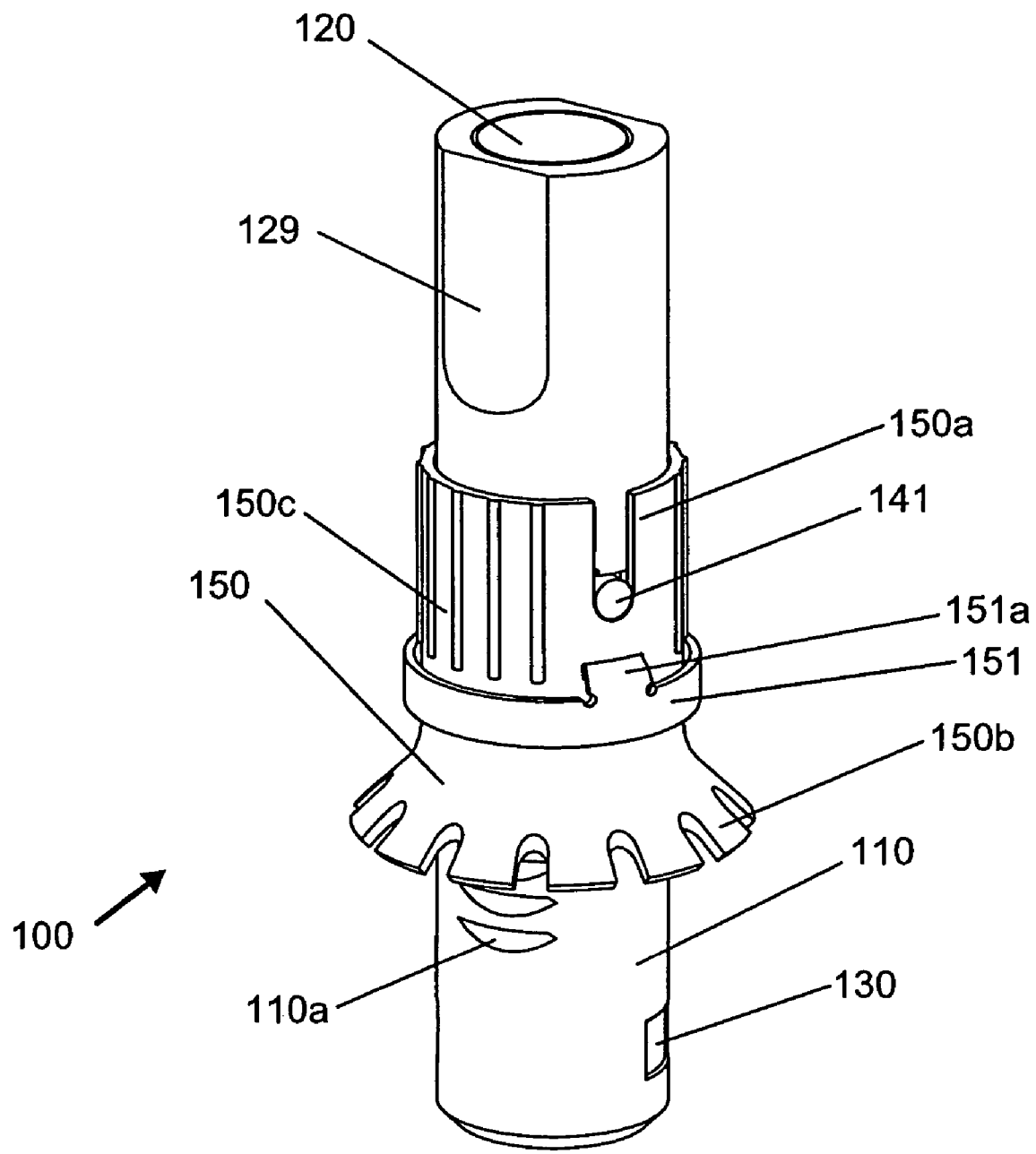
Figure 16B:
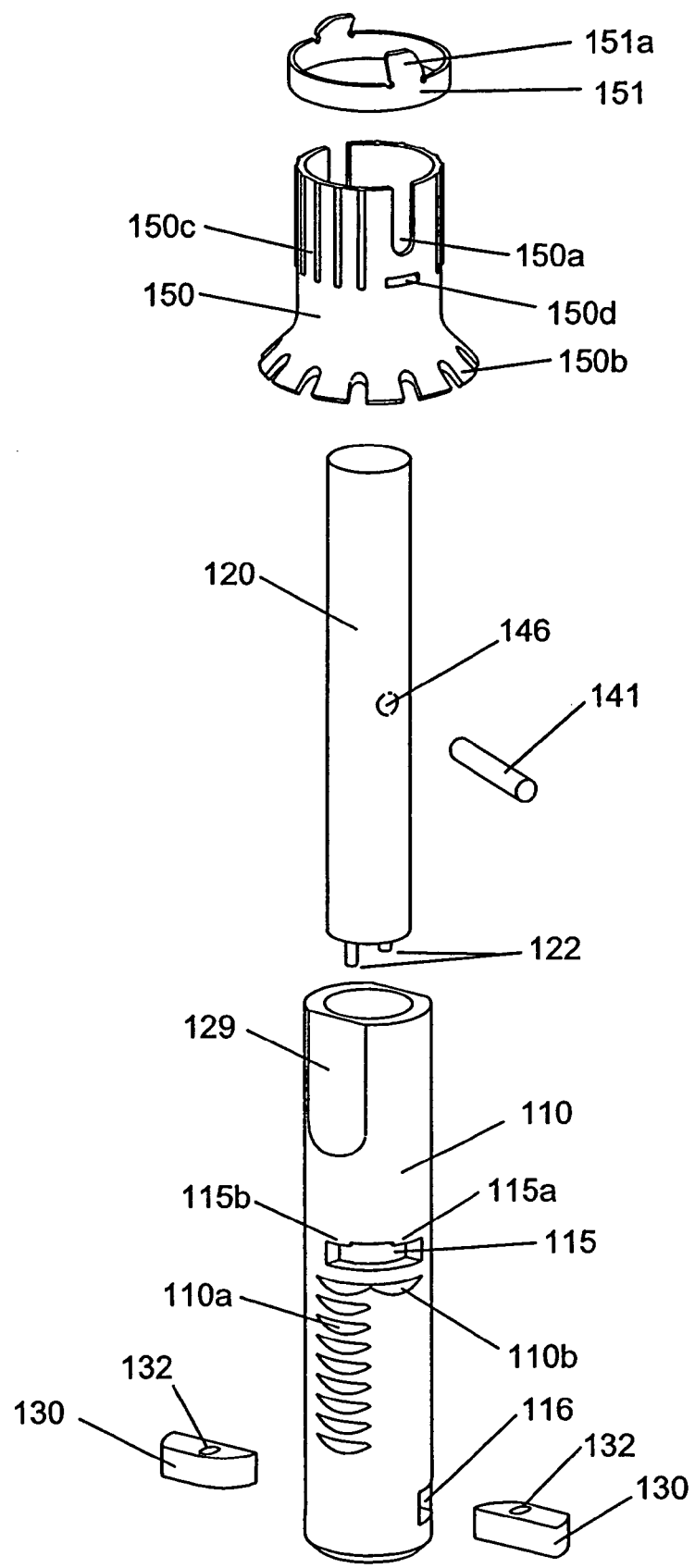
Figure 17:
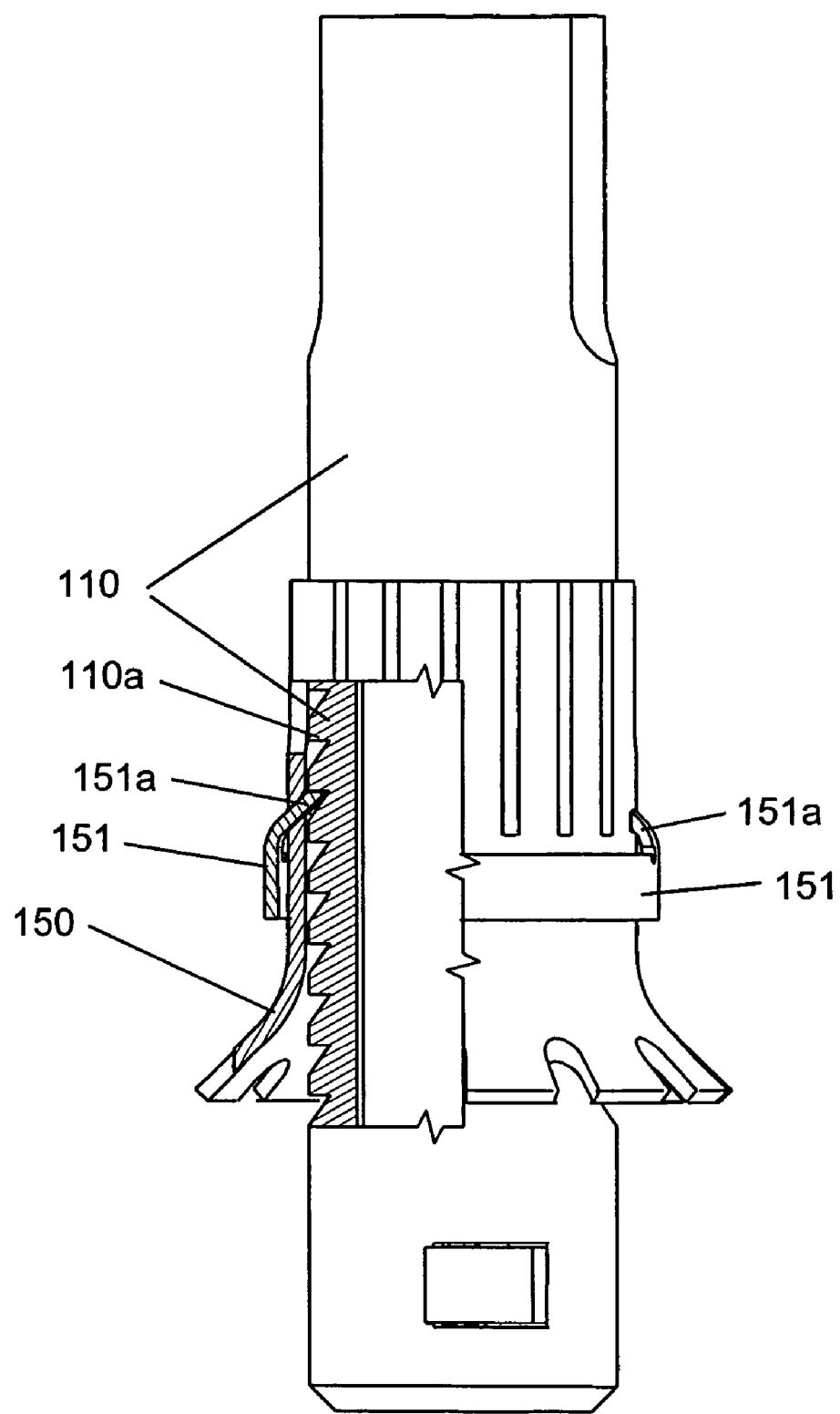
Figure 19:
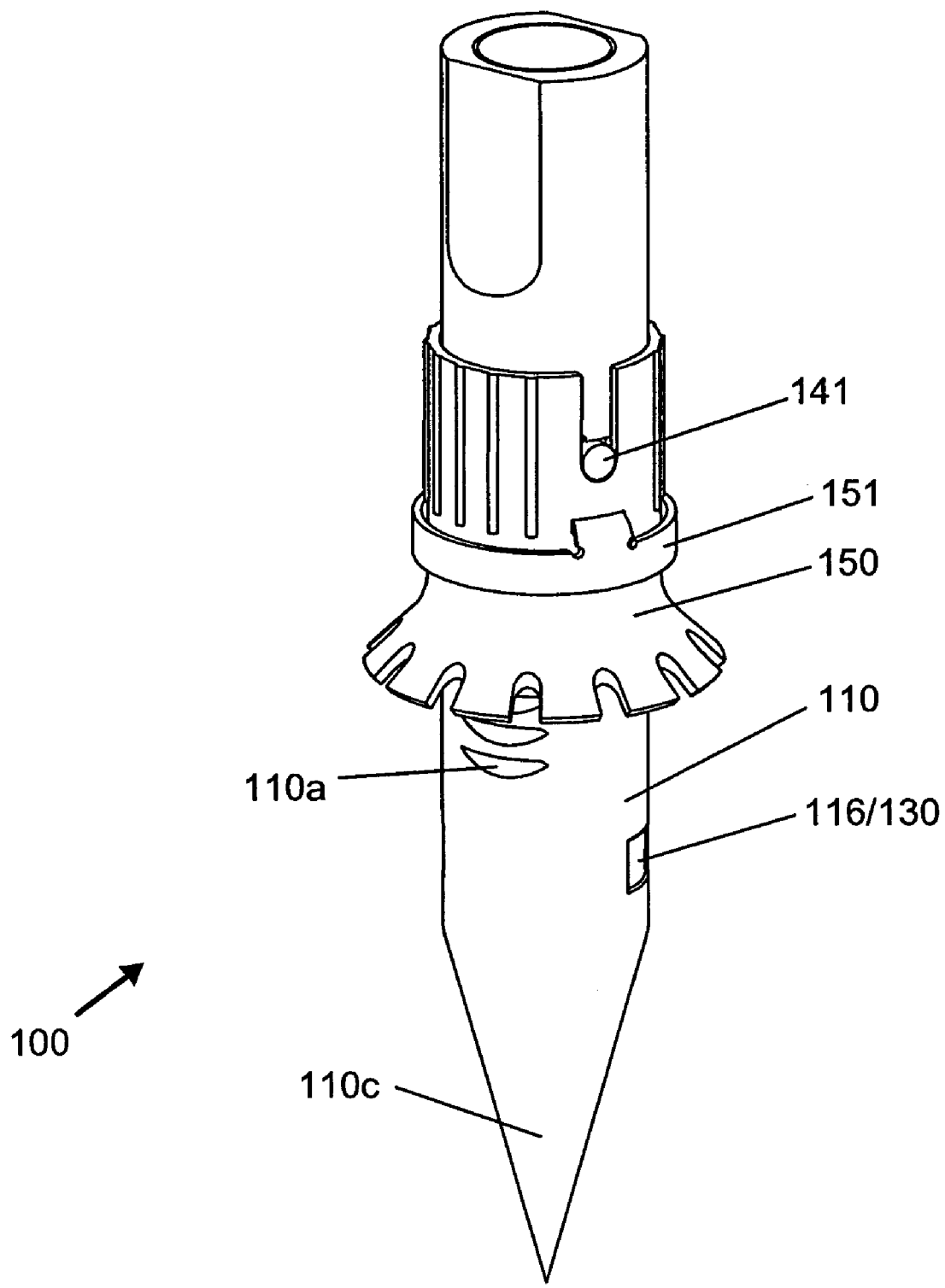
Figure 20A:
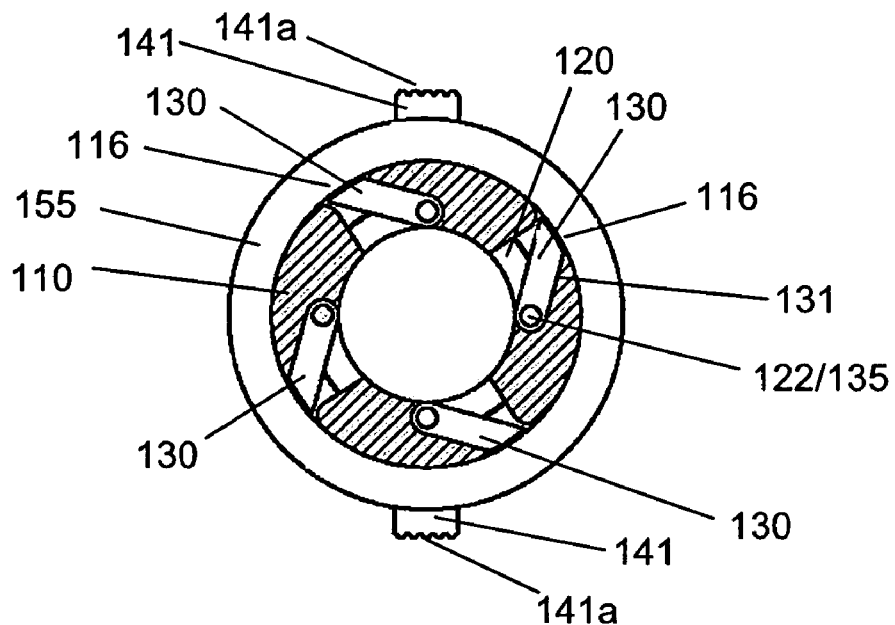
Figure 20B:
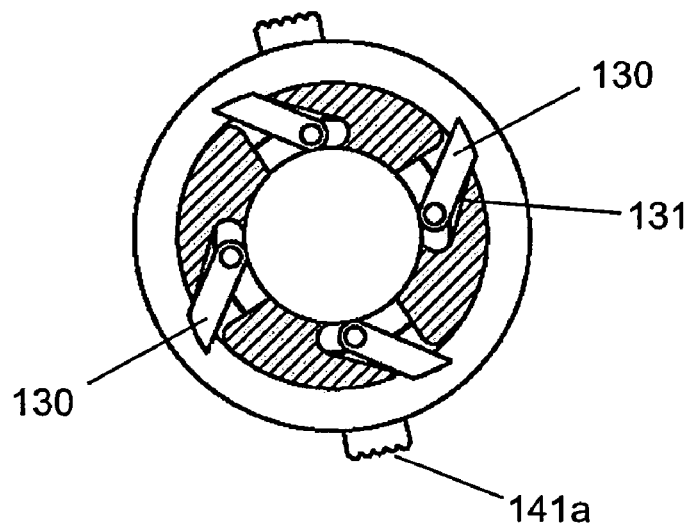
Figure 20C:
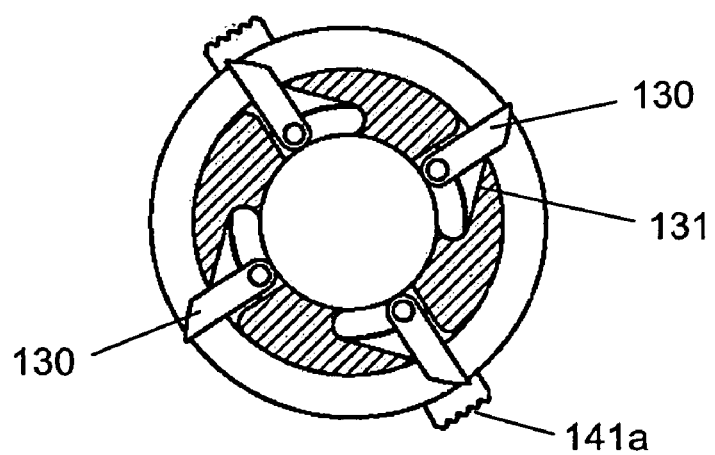
Figure 21:
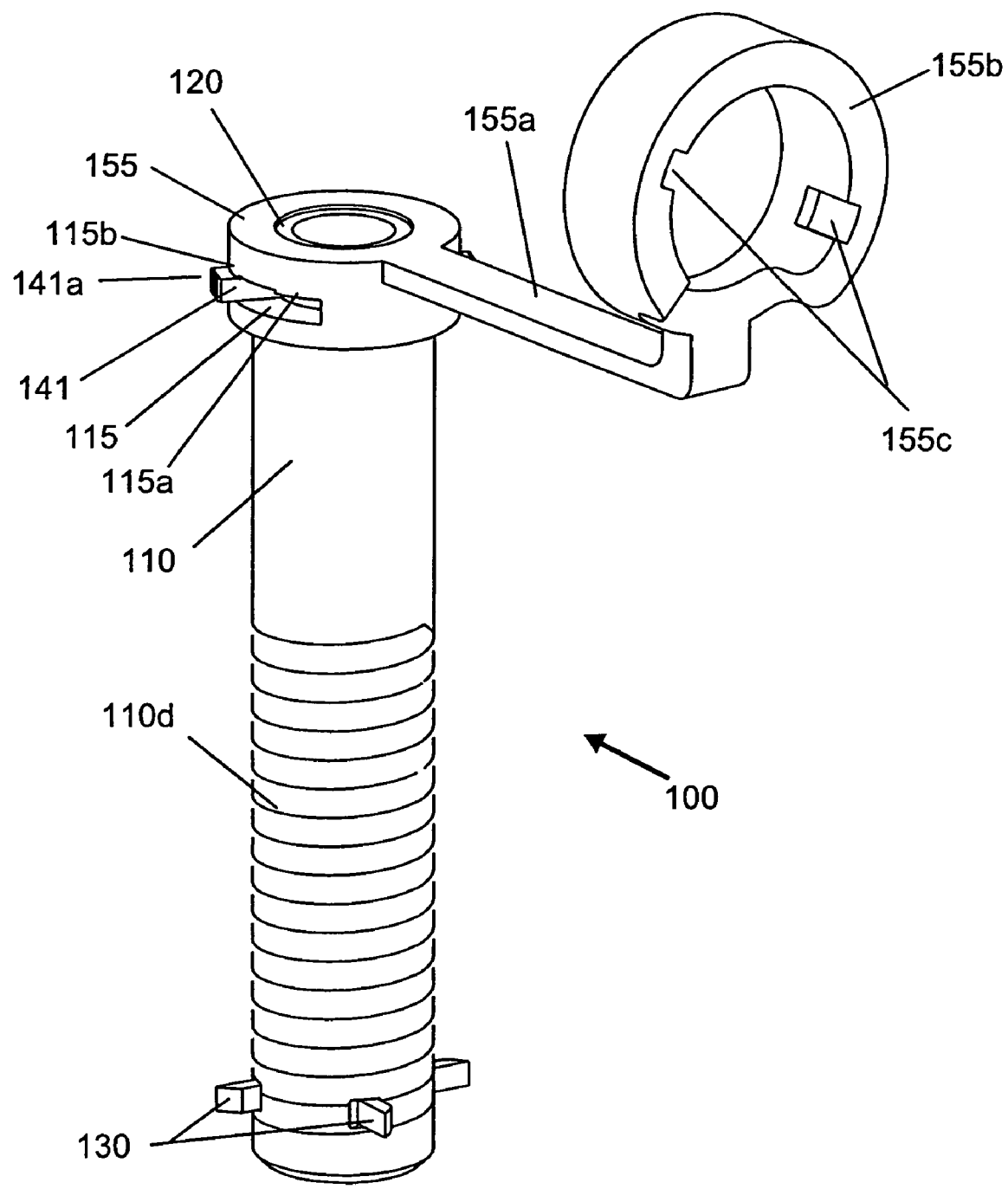
Figure 22:
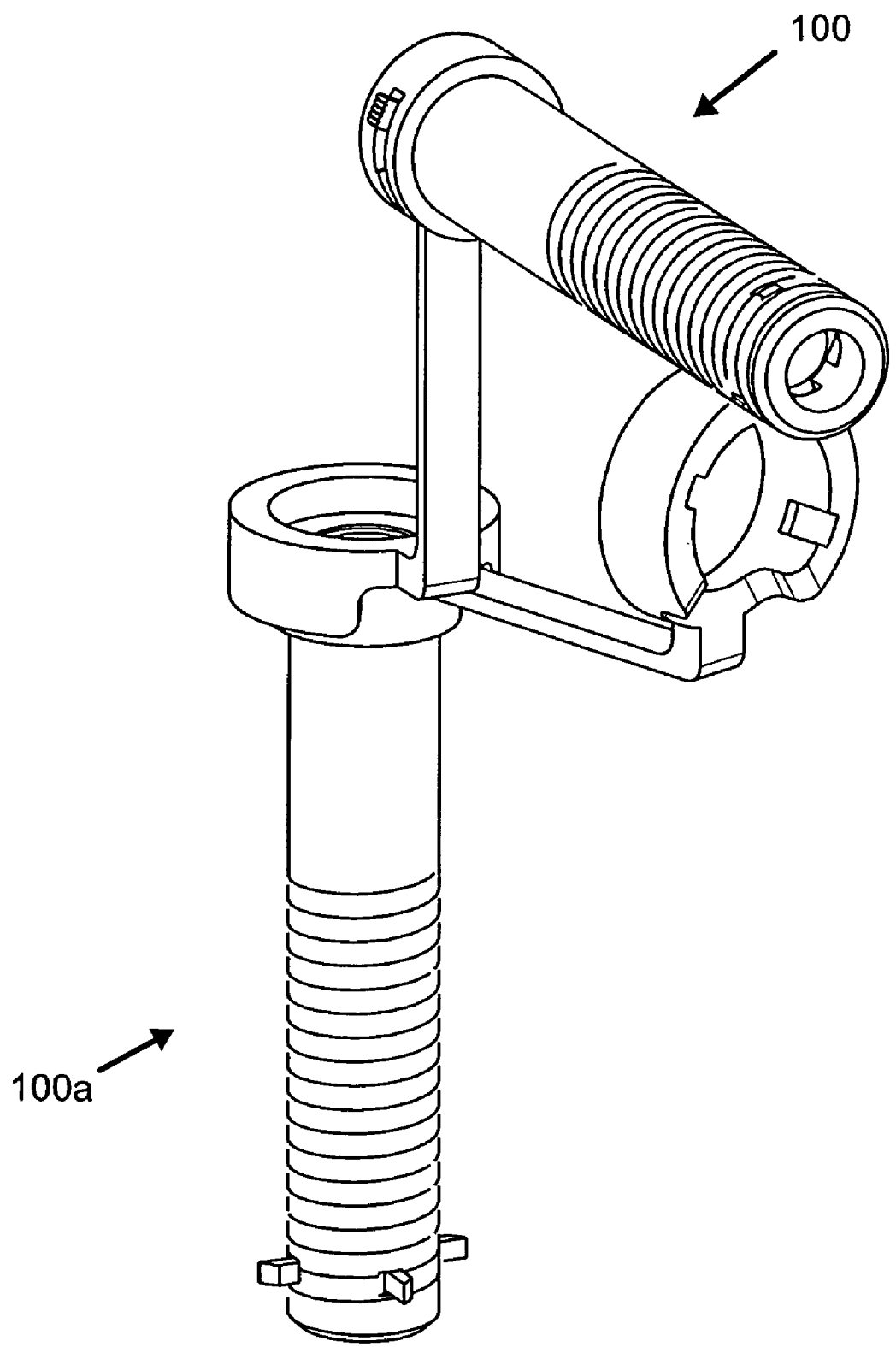

Having thus described the invention in general terms, reference will now be made to the accompanying drawings, which are not necessarily drawn to scale, and wherein:

FIG. 1A shows a perspective view of a fastener device according to one embodiment of the present invention;

FIG. 1B shows an exploded perspective view of a fastener device according to one embodiment of the present invention;

FIG. 1C shows an alternate exploded perspective view of a fastener device according to one embodiment of the present invention;

FIG. 2A shows a side cross-sectional view of a fastener device according to one embodiment of the present invention placed in an aperture defined in two stacked components wherein the tab device is not engaged with the second side of the stacked components;

FIG. 2B shows a side cross-sectional view of a fastener device according to one embodiment of the present invention placed in an aperture defined in two stacked components wherein the tab device is engaged with the second side of the stacked components;

FIG. 2C shows a side cross-sectional view of a fastener device according to one embodiment of the present invention placed in an aperture defined in two stacked components wherein the tab device is engaged with the second side of the stacked components and a nut is engaged with the first side of the stacked components;

FIG. 3A shows a bottom view of the fastener device according to one embodiment of the present invention wherein the tab device is in the retracted position with respect to the sleeve;

FIG. 3B shows a bottom view of the fastener device according to one embodiment of the present invention wherein the tab device is in the extended position with respect to the sleeve;

FIG. 4A shows a bottom view of the slug and tab device portion of the fastener device according to one embodiment of the present invention wherein the tab device is in the retracted position with respect to the sleeve;

FIG. 4B shows a bottom view of the slug and tab device portion of the fastener device according to one embodiment of the present invention wherein the tab device is in the extended position with respect to the sleeve;

FIG. 5 shows an exploded perspective view of a fastener device according to one embodiment of the present invention wherein a conduit is defined in the slug;

FIG. 6 shows a perspective view of a fastener device according to one embodiment of the present invention further comprising an extension device;

FIG. 7 shows a front view of two fastener devices, both having respective extension devices configured to connect two adjacent pieces of sheet material defining apertures having the fastener devices extending therethrough;

FIG. 8 shows a perspective view of a fastener device further comprising a cord receiver device;

FIG. 9 shows a perspective view of a fastener device including a plug insert extending through the slug and sleeve to restrict the rotation of the slug with respect to the sleeve;

FIG. 10 shows an overhead exploded perspective view of a fastener device including a plug insert extending through the slug and sleeve to restrict the rotation of the slug with respect to the sleeve;

FIG. 11 shows an exploded perspective view from below a fastener device including a plug insert extending through the slug and sleeve to restrict the rotation of the slug with respect to the sleeve;

FIG. 12A shows a perspective view of a fastener device operably engaged with a tool for rotating the slug to engage the tab device and for tightening the nut by advancing the nut toward the second portion of the sleeve;

FIG. 12B shows a front view of a fastener device in three stages of engagement to connect two adjacent pieces of sheet material defining apertures having the fastener device extending therethrough;

FIG. 13A shows a bottom view of the slug and tab device portion of the fastener device according to one embodiment of the present invention wherein the tab device is in the retracted position with respect to the sleeve;

FIG. 13B shows a bottom view of the slug and tab device portion of the fastener device according to one embodiment of the present invention wherein the tab device is in the extended position with respect to the sleeve;

FIG. 14A shows a perspective view of a fastener device including a flange disposed about the first portion of the sleeve and a plug insert extending through the slug and sleeve to restrict the rotation of the slug with respect to the sleeve;

FIG. 14B shows an exploded perspective view of a fastener device including a flange disposed about the first portion of the sleeve and a plug insert extending through the slug and sleeve to restrict the rotation of the slug with respect to the sleeve;

FIG. 15A shows an exploded perspective view of a fastener device including a plug insert extending through the slug and sleeve to restrict the rotation of the slug with respect to the sleeve wherein the plug insert forms a D-ring for rotating the slug;

FIG. 15B shows a perspective view of a fastener device including a D-ring plug insert extending through the slug and sleeve to restrict the rotation of the slug with respect to the sleeve wherein the D-ring is rotated and locked in a first catch stop corresponding to the retracted position;

FIG. 15C shows a perspective view of a fastener device including a D-ring plug insert extending through the slug and sleeve to restrict the rotation of the slug with respect to the sleeve wherein the D-ring is rotated and unlocked in a first catch stop corresponding to the retracted position;

FIG. 15D shows a perspective view of a fastener device including a D-ring plug insert extending through the slug and sleeve to restrict the rotation of the slug with respect to the sleeve wherein the D-ring is rotated and unlocked in a second catch stop corresponding to the extended position;

FIG. 15E shows a perspective view of a fastener device including a D-ring plug insert extending through the slug and sleeve to restrict the rotation of the slug with respect to the sleeve wherein the D-ring is rotated and locked in a second catch stop corresponding to the extended position;

FIG. 16A shows a perspective view of a fastener device including a press nut and locking ring disposed about the first portion of the sleeve and a plug insert extending through the slug, sleeve, and press nut to restrict the rotation of the slug with respect to the sleeve;

FIG. 16B shows an exploded perspective view of a fastener device including a press nut and locking ring disposed about the first portion of the sleeve and a plug insert extending through the slug, sleeve, and press nut to restrict the rotation of the slug with respect to the sleeve;

FIG. 17 shows a front partial cross-section of a fastener device including a press nut and locking ring disposed about the first portion of the sleeve and a plug insert extending through the slug, sleeve, and press nut to restrict the rotation of the slug with respect to the sleeve;

FIG. 18A shows a front view of a fastener device including a press nut and locking ring disposed about the first portion of the sleeve and a plug insert extending through the slug, sleeve, and press nut, wherein the sleeve is inserted in an aperture;

FIG. 18B shows a front view of a fastener device including a press nut and locking ring disposed about the first portion of the sleeve and a plug insert extending through the slug, sleeve, and press nut, wherein the sleeve is inserted in an aperture and the press nut is rotated to extend the tab device;

FIG. 18C shows a front view of a fastener device including a press nut and locking ring disposed about the first portion of the sleeve and a plug insert extending through the slug, sleeve, and press nut, wherein the locking ring is engaged to secure the press nut with respect to the first side of at least one component;

FIG. 18D shows a front view of a fastener device including a press nut and locking ring disposed about the first portion of the sleeve and a plug insert extending through the slug, sleeve, and press nut, wherein the locking ring is disengaged such that the press nut may be loosened with respect to the first side of at least one component;

FIG. 19 shows a perspective view of a fastener device including a press nut and locking ring disposed about the first portion of the sleeve and a plug insert extending through the slug, sleeve, and press nut, wherein the sleeve of the fastener comprises a piercing element configured to be capable of defining an aperture;

FIG. 20A shows a bottom cross-sectional view of a fastener device according to one embodiment of the present invention wherein the tab device is in the retracted position with respect to the sleeve;

FIG. 20B shows a bottom cross-sectional view of a fastener device according to one embodiment of the present invention wherein the tab device is in a partially-extended position with respect to the sleeve;

FIG. 20C shows a bottom cross-sectional view of a fastener device according to one embodiment of the present invention wherein the tab device is in the extended position with respect to the sleeve;

FIG. 21 shows a perspective view of a fastener device according to one embodiment of the present invention further comprising a cord receiver device; and FIG. 22 shows a perspective view of two fastener devices wherein the cord receiver of a first fastener device is operably engaged with the actuator device of a second fastener device to extend the tab device outward from the second portion of the sleeve of the second fastener device.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

FIG. 1A shows a perspective view of a fastener device 100 according to one embodiment of the present invention. In some embodiments, the fastener device 100 may comprise a sleeve 110 adapted to extend through an aperture 240 defined by at least one component 210a, 210b having a first side 220 and a second side 230 (see FIG. 2C, showing fastener device 100 installed in an aperture 240). The sleeve 110 of the fastener device 100 may further comprise a first portion 112 being configured to extend from the aperture 240 on the first side 220, and a second portion 114 configured to extend from the aperture 240 on the second side 230. Furthermore according to some embodiments, the second portion 114 of the sleeve 110 may define a slit 116.

According to some embodiments, the fastener device 100 may further comprise an actuator device, such as, for example a slug 120 (as described more fully below) operably engaged with the first portion 112 of the sleeve 110 and configured to be actuated from the first side (by for instance a tool device, or in some instances, by hand). Furthermore, the fastener device 100 may also comprise a tab device 130 operably engaged with the second portion of the sleeve (and, in some embodiments connected therewith as described more fully below) and capable of operably engaging the actuator device (such as, for instance, the slug 120). The tab device 130 may be responsive to the actuator device as the actuator device is actuated so as to extend substantially laterally outward from the second portion 114 of the sleeve 110. Thus, the tab device 130 may cooperate with the actuator device such as a rotatable slug 120 (see below) so as to become selectively engaged with the second side 230 of the at least one component 210*a*, 210*b*.

Thus, according to some embodiments, the fastener device 100 may be suitable for extending through an aperture 240 defined by at least one component 210*a*, 210*b* having a first side 220 and a second side 230 (see FIG. 2C), wherein the second side 230 of the at least one component 210*a*, 210*b* may not be easily accessible. More particularly, the fastener device 100 according to the various embodiments of the present invention, may be actuated from the first side 220 so as to become selectively engaged with the second side 230 of the at least one component 210*a*, 210*b*. For example, the fastener device 100 may be extended through and secured within an aperture defined in installed drywall, within apertures defined in fuselage panels installed on aircraft, in apertures defined in biological materials such as bone or cartilage, or in apertures defined in various other materials wherein the fastener device 100 must be secured in the aperture without accessing an inaccessible or "blind" side of the material.

According to some embodiments of the fastener of the present invention, the fastener device 100 may comprise a piercing element 110*c* configured to be capable of piercing the at least one component 210*a*, 210*b* in order to define an aperture in the component. As shown generally in FIG. 19, the second portion 114 of the sleeve 110 may further comprise a piercing element 110*c* configured to be capable of defining the aperture in the at least one component. The piercing element 110*c* may comprise a sharp conical shape as shown generally in FIG. 19 and/or other piercing elements suitable for defining an aperture in one or more component types. For example, the piercing element may comprise a self-tapping screw 110*d* as shown in FIG. 21 (for use, for example as a wood screw, bone screw, or other fastener type). In addition, the piercing element may also comprise a frusto-conical shape, defining substantially sharp edges and having a hollow center portion, such that the fastener device 100 may serve as a conduit through the at least one component 210*a*, 210*b* when installed.

As shown in the exploded view of the fastener device 100 in FIG. 1B, the actuator device may comprise a slug 120 which may be disposed at least partially within the sleeve 110 and configured to be capable of rotating with respect to an inner surface of the sleeve 110. The slug 120 may have at least one pin 122 extending therefrom toward the second portion 114 of the sleeve 110 defining the slit 116. The fastener device 100 further comprises a tab device 130 disposed within the sleeve 110. The tab device 130 is further capable of operably engaging the at least one pin 122. Thus, the tab device 130 is responsive to the at least one pin 122 as the slug 120 is rotated so as to extend laterally outward through the slit 116 to an extended position (see FIG. 2C) as the slug 120 is rotated in a first direction, and to retract laterally inward through the slit 116 to a retracted position (see FIG. 2A) as the slug 120 is rotated in a second direction. The tab device 130 may thereby cooperate with the slug 120 so as to selectively prevent the sleeve 110 from being removed from the aperture 240 through the first side 220 (as shown generally in FIG. 2B).

As shown in FIG. 1B, the slug 120 may further comprise a first tool interface 124 configured to be capable of being engaged by and selectively rotated by, a tool, such as, for instance a Philips head screwdriver. Also, as shown generally in FIGS. 9-12, the first tool interface 124 may comprise a rotatable extension of the slug 120 such that rotation of the tool interface 124 may, in turn rotate the slug 120 in order to actuate the tab device 130. For example, as shown in FIG. 12A, the tool interface may comprise a rectangular extension that is configured to be capable of operably engaging a wrench 125 defining an actuating aperture 125*a* such that a user may utilize the wrench 125 to actuate the tab device 130 in order to secure the fastener device 100. In addition, the wrench 125 may further define (at an opposing end, for example, as shown in FIG. 12A) a tightening aperture 125*b* that is sized and shaped to operably engage a nut 150 so as to be further capable of tightening the nut 150 with respect to a first side 220 (see FIGS. 2A-2C) of the at least one component 210*a*, 210*b*. In other embodiments, the first tool interface 124 may be configured to be capable of being engaged by and selectively rotated by: flat head screwdrivers, hex head screwdrivers, "star" cross section screwdrivers, and/or other tools suitable for selectively rotating the slug 120 (and the at least one pin 122 extending therefrom) with respect to the tab device 130 so that as the slug 120 is rotated in a first direction, the tab device 130 may be extended substantially laterally outward through the slit 116 to an extended position, and so that as the slug 120 is rotated in a second direction, the tab device 130 may be retracted laterally inward through the slit 116 to a retracted position.

According to some embodiments, the fastener device 100 of the present invention (shown in FIGS. 21-22) may further comprise an extension device that may be used as a tool to actuate the tab device 130 of a second fastener device. For example, as shown in FIG. 21, the extension device may comprise a cord receiver device 155*a-c* that may comprise an annular portion 155*b* through which cord, rope, carabiners, loops, hooks, fasteners, or other devices and lines may be passed in order to affix the cord to the at least one component 210*a*, 210*b* in which the fastener device 100 may be inserted. Further, the annular portion 155*b* of the cord receiver device may define one or more plug insert apertures 155*c* configured to be capable of operably engaging a plug insert 141 (as described below with respect to FIGS. 14A-15E) of a second fastener device such that the first fastener device 100 may be used as a tool to rotate the slug 120 and thereby extend the tab device 130 of the second fastener device 100*a* (as described below with respect to FIGS. 20A, 20B, and 20C) as shown in FIG. 22. According to other embodiments, the extension device of the first fastener device may be configured to be capable of actuating a variety of different types of first tool interfaces 124 as described above, such that a user carrying a plurality of identical fastener devices 100 need not carry a specialized tool (such as a wrench) for actuating the tab device of the fastener device 100.

In other embodiments, the slug 120 (or other actuator device—such as, for instance, a thumb screw) may be selectively rotated by hand so as to extend the tab device 130 substantially laterally outward through the slit 116 to an extended position. According to other embodiments, as shown generally in FIGS. 14A-15E the fastener device 100 may further comprise a plug insert 141 configured to be capable of actuating the fastener device 100 to extend the tab device 130 to engage the "blind side" (such as the second side 230 as shown in FIG. 2A) of an aperture defined in at least one component. In such embodiments, the fastener device 100 may further comprise a guide aperture 115 defined in the first portion 112 of the sleeve 110, a slug aperture 146 defined in the slug 120, and a plug insert 141 disposed within the slug aperture 146 and extending radially outward from the slug aperture 146 and at least partially through the guide aperture 115. In some embodiments, as shown generally in FIGS. 14A-15E the guide aperture 115 may be defined in a flange 155 disposed at least partially around an outer surface of the first portion 112 of the sleeve 110 so as to prevent the sleeve 110 from being removed from the aperture through the second side 230 of the at least one component 210a, 210b. Thus, the plug insert 141 may be configured to be capable of rotating the slug 120 with respect to the sleeve 110 in order to retract and extend the tab device 130. According to various embodiments, the plug insert 141 (shown generally in FIG. 14A) may comprise various structures suitable for engaging the tab device 130 of the fastener 100 by hand or with simple tools. For example, the plug insert 141 may comprise a split ring extending through the guide aperture 115 and the slug aperture 146 (having ends that may be separated in order to allow the split ring to be inserted through the apertures 115, 146) so as to allow a user to rotate the slug 120 and extend the tab device 130 by hand.

In another fastener 100 embodiment, shown generally in FIGS. 15A-15E, the plug insert 141 may comprise a split D-ring 141 comprising a straight portion extending through the slug aperture 146 and a curved portion 141c extending from the straight portion and through the guide aperture 115. In addition, the straight portion of the split D-ring 141 may further define shoulders 141b configured to engage at least one of a first catch stop 115a and a second catch stop 115b defined in the guide aperture 115 of the sleeve 110. FIGS. 15B-15E show four positions of the fastener device 100 as determined by the position of the plug insert 141 relative to the guide aperture 115. For example, as shown in FIG. 15B, the tab device 130 is in the retracted position within the sleeve 110 and the plug insert 141 (shown as a split D-ring) is retained by the cooperation of the first catch stop 115a and at least one of the shoulders 141b defined in the straight portion of the split D-ring 141. FIG. 15C also shows the tab device 130 in the retracted position with respect to the sleeve 110, however, the curved portion 141c of the split D-ring 141 (plug insert) has been elastically forced over a detent rim 115d (see FIG. 15A) formed by the flange 155. In some embodiments, the curved portion of the split D-ring 141 and the detent rim 115d may be shaped and sized to be in interference such that the swiveling path of the curved portion 141c is partially blocked by the detent rim 115d. In such embodiments, the split D-ring 141 may be formed of an elastic material (such as an elastic polymer, metal, or composite component) in order to be capable of being elastically forced past the detent rim 115d and into the upward position shown generally in FIG. 15C. In the position shown in FIG. 15C the plug insert 141 (split D-ring) is free to rotate the slug 120 about the inner surface of the sleeve 110 since the shoulder 141b of the plug insert 141 is capable of clearing the middle portion 115c of the guide aperture 115 defined in the flange 155.

FIG. 15D shows the tab device 130 in the extended position due to the rotation of the slug 120 about the inner surface of the sleeve 110 (using the plug insert 141). Finally, in FIG. 15E, the tab device 130 is shown in the extended and locked position wherein the curved portion 141c of the split D-ring 141 has been elastically forced over the detent rim 115d of the flange 155 and the shoulder 141b has been rotated such that the split D-ring 141 may no longer clear the middle portion 115c of the guide aperture 115. Thus, in the position shown generally in FIG. 15E, the plug insert 141 is prevented from rotating by the second catch stop 115b and the shoulder 141b such that the plug insert 141 may not be used to rotate the slug 120 about the inner surface of the sleeve 110.

As shown generally in FIGS. 14A-14B the plug insert 141 may also comprise a straight insert 141 comprising a substantially straight portion extending through the slug aperture 146. The straight insert 141 may further comprise a textured portion 141a extending from the guide aperture 115, wherein the textured portion 141a is capable of being actuated by a single fingertip. In addition, as shown generally in FIGS. 14A and 14B the straight insert 141 may also comprise a pair of outwardly biased legs configured to be capable of expanding to engage at least one of the first catch stop 115a and the second catch stop 115b so as to correspondingly retain the plug insert 141 in at least one of the first position corresponding to the retracted position and the second position corresponding to the extended position (shown generally in FIG. 14A wherein the textured portion 141a of the straight insert 141 is extending from the first catch stop). Thus, in embodiments wherein the plug insert 141 comprises a straight insert having a pair of outwardly biased legs, the legs of the straight insert 141 may be elastically compressed by the middle portion 115c of the guide aperture 115 so that the slug 120 may be actuated by a user's fingertip in order to retract and/or extend the tab device 130 in relation to the sleeve 110. As shown generally in FIGS. 14A-14B, the first portion 112 of the sleeve 110 may further define an inner threaded portion 139 so as to permit an extension device comprising a cooperating outer threaded portion to be affixed to the fastener device 100 on the first side 220.

As shown generally in FIGS. 4A-4B, the tab device 130 may further comprise a guide slot 132 configured to be capable of receiving the at least one pin 122 extending from the slug 120 such that the tab device 130 may be extended and/or retracted by the rotation of the slug 120. As shown in FIGS. 4A-4B, the guide slot 132 may further have a first catch stop 132a configured to retain the tab device 130 in the retracted position (see FIG. 4A), and a second catch stop 132b configured to retain the tab device 130 in the extended position (see FIG. 4B). In addition, as shown generally in FIG. 1C, the second portion 114 of the sleeve 110 may further comprise a floor 118 and at least one spring pin 111 extending from the floor 118 toward the first portion 112 of the sleeve 110. Further, the at least one spring pin 111 may be operably engaged with the tab device 130 so that the tab device 130 may rotate about the at least one spring pin 111 so as to extend laterally outward through the slit 116 to an extended position (see FIG. 4B) as the slug 120 is rotated in a first direction, and to retract laterally inward through the slit 116 to a retracted position (see FIG. 4A) as the slug 120 is rotated in a second direction. According to some embodiments, the second direction may be defined as being opposite the first direction, as shown generally in FIGS. 4A-4B. The at least one spring pin 111 may be inserted through a floor aperture 113 defined in the floor 118 of the sleeve 110 as shown in FIG. 1C, however, in other embodiments, the at least one spring pin 111 may be integrated with the floor 118 of the sleeve 110 as, for instance, a single piece.

As shown in detail in FIGS. 4A-4B the tab device 130 may define a tab aperture 134 through which the at least one spring pin 111 may extend so as to operably engage the tab device 130. Thus, the tab device 130 may rotate about the at least one spring pin 111 so as to move from a retracted position relative to the sleeve 110 (see FIG. 4A) to an extended position relative to the sleeve (see FIG. 4B). One skilled in the art will appreciate that the tab device may also be integrated and/or molded as part of the sleeve 110 and still be capable of rotating in a manner similar to that shown in FIGS. 4A-4B. As described above with respect to FIGS. 1B-1C, the tab device 130 is operably engaged with at least one pin 122 extending from the slug 120. As shown in FIGS. 4A-4B, as the slug 120 is rotated with respect to the sleeve 110, the at least one pin 122 may actuate the guide slot 132 defined in the tab device 130. Thus, as the slug 120 is rotated, the at least one pin 122 may be actuated with respect to the guide slot as the tab device 130 rotates with respect to the at least one spring pin 111. Thus, the at least one pin 122 may be moved from a first catch stop 132a to a second catch stop 132b as the tab device 130 is extended from the retracted position (see FIG. 4A) to the extended position (see FIG. 4B). The catch stops 132a, 132b may act to temporarily restrain the slug 120 (and the at least one pin 122 extending therefrom) from rotating with respect to the sleeve 110 such that the tab device 130 may be at least partially restrained in either the retracted position (see FIG. 4A) or the extended position (see FIG. 4B) with respect to the sleeve 110.

Furthermore, as shown generally in FIGS. 4A-4B, the guide slot 132 defined in the tab device 130 may also define a range of rotation for the tab device (and the slug 120 and the at least one pin 122 operably engaged therewith) such that the slug 120 need only be rotated through a partial turn (by for instance a tool engaged with the first tool interface 124) in order to extend and/or retract the tab device 130 from the retracted and/or extended position (see FIGS. 4A-4B) relative to the sleeve 110. A bottom view (as seen from the second side 230) of the fastener device 100 is shown in FIGS. 3A-3B, depicting the range of rotation for the at least one pin 122 relative to the floor 118 of the sleeve 110. For instance, as shown in FIG. 3A the tab device 130 is in the retracted position (and is not visible) relative to the sleeve 110. In contrast, FIG. 3B shows the tab device 130 in the extended position relative to the sleeve 110 as a result of the at least one pin 122 being rotated with respect to the sleeve 110 through about a one-quarter turn. One skilled in the art will appreciate that the tab device 130 and the guide slot 132 defined therein may be modified so as to engage the at least one pin 122 extending from the slug 120 such that the range of rotation of the slug 120 (and the at least one pin 122 extending therefrom) required to fully extend and/or retract the tab device 130 relative to the sleeve 110 may be increased and/or decreased.

According to some embodiments of the fastener device of the present invention, as shown generally in FIGS. 20A, 20B, and 20C, the sleeve 110 may define at least one cam chamber 131 therein (located within the second portion 114 of the sleeve 110 and in communication with the slit 116 also defined in the second portion 114). According to the fastener 100 embodiments of FIGS. 20A-20C, a pin aperture 135 in the tab device 130 may be operably engaged with the pin 122 extending from the slug 120 such that the tab device may be responsive to the pin 122 extending therethrough as the slug 120 is rotated. Thus the shape of the cam chamber 131 defined in the sleeve 110 may thus cause the tab device 130 to extend laterally outward from the cam chamber 131 and through the slit 116 to an extended position as the slug is rotated in a first direction, as shown generally in FIGS. 20C (fully extended position) and 20B (partially extended position). Furthermore, the rotation of the slug 120, pin 122, and tab device 130 in relation to the cam chamber 131 may further allow the tab device 130 to retract laterally inward through the slit 116 to a retracted position within the cam chamber 131 as the slug 120 is rotated in a second direction (as shown generally in FIG. 20A). The cam chamber 131 may be shaped and sized to receive the pin 122 extending from the slug 120 and the tab device 130 operably engaged with the pin, such that the cam chamber actively rotates and extends the tab device 130 as the slug 120 rotates with respect to the sleeve 110 (as shown in FIGS. 20A-20C).

According to some embodiments, such as those shown in FIGS. 1B-1C, the fastener device 100 of the present invention may further comprise a plug device 140 disposed at least partially within the sleeve 110 between the first side 220 (see FIG. 2A) and the slug 120. The plug device 140 is configured to be capable of being tightened with respect to the slug 120 so as to selectively prevent the slug 120 from being removed from the sleeve 110 through the first side 220. According to some embodiments, such as those shown in FIG. 1B-1C, the plug device 140 may be further configured to be capable of rotating with respect to an inner surface of the sleeve 110. The plug device 140 may further comprise an outer threaded surface 142, and the inner surface of the sleeve may further comprise an inner threaded portion 123 configured to cooperate with the outer threaded surface 142. Thus, the plug device 140 may be configured to be capable of being tightened with respect to the slug 120 so as to selectively prevent the slug 120 from being removed from the sleeve 110 through the first side 220 (see FIG. 2A).

As shown in FIG. 1B, the plug device 140 may further comprise a second tool interface 144 configured to be capable of being engaged and selectively rotated by a tool, such as, for instance, a hex-head screwdriver. In other embodiments, the second tool interface 144 may be configured to be capable of being engaged by and selectively rotated by: flat head screwdrivers, Philips head screwdrivers, "star" cross section screwdrivers, and/or other tools suitable for selectively rotating and/or tightening the plug device 140 with respect to the inner threaded portion 123 of the sleeve 110. In some advantageous embodiments, the second tool interface 144 may be configured to be capable of being engaged by a tool that is substantially different in cross section from the tool that may be capable of engaging the first tool interface 124 and selectively rotating the slug 120 such that the slug 120 may not be inadvertently rotated with respect to the sleeve 110 when the plug device 140 is being rotated with respect to the sleeve 110 so as to retain the slug 120 within the sleeve 110.

Alternatively, the plug device 140 may further comprise one or more resilient rings disposed on an outer surface of the plug device 140 (the resilient rings comprising, for instance, an elastomeric material) such that the plug device 140 may be press-fit into the sleeve 110 between the first side 220 and the slug 120 so as to selectively prevent the slug 120 from being removed from the sleeve 110 through the first side 220. In addition, the plug device 140 may comprise a variety of materials and/or exterior textures so as to allow the plug device 140 to be retained within the sleeve 110 between the first side 220 and the slug 120 so as to selectively prevent the slug 120 from being removed from the sleeve 110 through the first side 220. According to other embodiments, a locking washer may be disposed within the sleeve 110 between the slug 120 and the plug device 140 such that the locking washer may be configured to exert a frictional retaining force on the slug 120 and the plug device 140 so as to prevent the slug 120 (and the tab device 130 operably engaged therewith) from rotating with respect to the sleeve 110.

According to some embodiments, such as those shown in FIGS. 1B-1C, the fastener device 100 of the present invention may further comprise a nut 150 disposed at least partially around an outer surface of the first portion 112 of the sleeve 110. Furthermore, the nut 150 may be further configured to be capable of being tightened with respect to the first side 220 (see generally FIG. 2C) so as to selectively prevent the sleeve 110 from being removed from the aperture 240 through the second side 230.

According to some embodiments, the nut 150 may further comprise one or more resilient rings disposed on an inner surface of the nut 150 (the resilient rings comprising, for instance, an elastomeric material) such that the nut 150 may be press-fit around the first portion 112 of the sleeve 110 to engage the first side 220 so as to selectively prevent the fastener device 100 from being removed from the aperture 240 through the second side 230 (see FIG. 2A). In addition, the nut 150 may comprise a variety of materials and/or interior textures so as to allow the nut 150 to be retained about the first portion 112 of the sleeve 110 so as to selectively prevent the sleeve 110 (and therefore the fastener device 100) from being removed from the aperture 240 through the second side 230.

According to some embodiments, the nut 150 may be further configured to be capable of rotating with respect to the outer surface of the first portion 112 of the sleeve 110. The nut 150 may further comprise an inner threaded surface 152, and the outer surface of the sleeve 110 may further comprise an outer threaded portion 117 configured to be capable of cooperating with the inner threaded surface 152 of the nut 150 such that the nut 150 may be tightened with respect to the first side 220 (see FIG. 2A) so as to selectively prevent the sleeve 110 from being removed from the aperture 240 through the second side 230. According to other embodiments, a locking washer may be disposed about the first portion 112 of the sleeve 110 between the nut 150 and the first side 220 of the at least one component 210 such that the locking washer may be configured to exert a frictional retaining force on the nut 150 and the first side 220 of the at least one component 210 so as to prevent the nut 150 from rotating with respect to the sleeve 110 (and thereby loosening the retaining force exerted on the at least one component 210 via the cooperation of the nut 150 and the tab device 130 (see FIG. 2C)).

As shown in FIGS. 2A-2C, the nut 150 may be configured to be tightened by a wrench or other tool suitable for rotating the nut 150 with respect to the first portion 112 of the sleeve 110 so as to bring the nut 150 into contact with the first side 220 of the at least one component 210a, 210b. As such the nut 150 may cooperate with the tab device 130 (in the extended position, as shown in FIG. 2C) so as to retain the fastener device 100 within the aperture 240 defined in the at least one component 210 (depicted in FIG. 2C as a first sheet material 210a and a second sheet material 210b). Also, the outer threaded portion 117 of the sleeve 110 may extend for the full length of the first portion 112 of the sleeve 110 such that the nut 150 may be fully adjustable with respect to the first portion 112 of the sleeve 110. Thus, the nut 150 may be tightened and/or loosened with respect to the first side 220 of the at least one component 210 such that the fastener device 100 may be suitable for extending through and being retained in an aperture 240 defined in at least one component 210 having a variety of different thicknesses.

According to some embodiments, as shown generally in FIGS. 14A-15E, the fastener device 100 may further comprise a flange 155 disposed at least partially around an outer surface of the first portion 112 of the sleeve 110 so as to prevent the sleeve 110 from being removed from the aperture 240 through the second side 230. Thus, the flange 155 may replace and/or supplement the nut 150 in cooperating with the extended tab device 130 in order to secure the fastener device 100 within the aperture defined in the at least one component 210a, 210b.

FIGS. 2A, 2B, and 2C show a side view cross section of the fastener device 100 according to one embodiment of the present invention wherein the fastener device 100 may extend through an aperture 240 defined in an least one component 210. In the depicted embodiment, the at least one component 210 comprises two stacked sheet materials comprising a first sheet material 210a (defining a first side 220) and a second sheet material 210b (defining a second side 230). Thus, the first portion 112 of the sleeve 110 is configured to extend from the aperture 240 to the first side 220 and the second portion 114 (defining the slit 116) is configured to extend from the aperture 240 to the second side 230.

As shown in FIG. 2A the fastener device 100 may be placed into the aperture 240 from the first side 220. For initial insertion into the aperture 240, the slug 120 and at least one pin 122 extending therefrom may be rotated with respect to the sleeve 110 so as to return the tab device 130 to the retracted position (see FIGS. 3A and 4A) relative to the sleeve 110. In the retracted position, the tab device 130 does not extend laterally outward from the slit 116 defined in the second portion of the sleeve 110 such that the sleeve 110 (and the fastener device 100) may be inserted into the aperture 240 from the first side 220. According to some embodiments of the fastener device 100, the nut 150 may be placed about the first portion 112 of the sleeve 110 prior to the insertion of the fastener device 100 into the aperture 240 so as to prevent the fastener device 100 from passing completely through the aperture 240 from the first side 220 to the second side 230.

As shown in FIG. 2B, once inserted into the aperture 240, the slug 120 (and the at least one pin 122 extending therefrom) may be rotated with respect to the sleeve 110 so as to rotate the tab device 130 relative to, for instance, the at least one spring pin 111 (as described more fully above). The rotation of the slug 120 (by for instance, a tool suitable for rotating the slug through about one-quarter turn) may, in turn, extend the tab device 130 from the retracted position (see FIGS. 3A and 4A) to the extended position (see FIGS. 3B and 4B) relative to the sleeve. Thus, the tab device 130 may extend laterally from the slit 116 defined in the second portion 114 of the sleeve 110 so as to prevent the sleeve 110 from being removed from the aperture 240 through the first side 220.

According to some fastener embodiments (shown, for example, in FIGS. 14A and 14B), the slit 116 may also include a keyway 116a and the tab device 130 may further comprise a keyed surface 130a operably engaged with the keyway 116a so that the tab device 130 extends substantially laterally outward and retracts substantially laterally inward from the sleeve 110 of the fastener 100 in response to the rotation of the slug 120 (by the movement of the plug insert 141 (as described generally below) or the rotation of the slug 120 via a tool interface 124). Thus, the cooperation of the keyway 116a and the keyed surface 130a of the tab device 130 may ensure that the tab device extends substantially laterally outward from the sleeve 110 such that the tab device 130 may securely retain the fastener device 100 within the aperture in response to various shear and torque forces that may be exerted on the first portion 112 and second portion 114 of the sleeve 110.

FIG. 2C shows the fastener device 100 retained in the aperture 240 defined by the first and second sheet materials 210a, 210b, respectively. As shown, the nut 150 may be tightened with respect to the first side 220 so as to prevent the sleeve 110 from being removed from the aperture through the second side 230. In addition, the compressive force exerted on the first and second sheet materials 210a, 210b may also act to stabilize the fastener device 100 within the aperture 240 so as to effectively retain the fastener device 100 in the aperture.

According to other embodiments of the fastener device 100 of the present invention, the fastener device 100 may be further configured to provide a conduit through the at least one component 210 between the first side 220 and the second side 230. For instance, as shown in FIG. 5 the fastener device 100 of the present invention, may in some embodiments, comprise a slug 120 wherein the slug 120 defines a conduit 126 extending therethrough so as to allow for materials to pass through the sleeve 110 between the first side 220 and the second side 230 when the tab device 130 is extended laterally outward through the slit 116 (as shown, for instance, in FIG. 4B). According to some embodiments, wherein the sleeve 110 further comprises a floor 118, the floor may also be provided with an aperture 119 such that floor does not prevent the passage of material through the sleeve 110 between the first side 220 and the second side 230. The conduit 126 defined in the slug 120 according to this embodiment may have, for instance, a hexagonal shaped cross-section such that the conduit may receive a hex key suitable for rotating the slug 120 and thereby actuating the tab device 130 (as more fully described above). As such, this embodiment of the fastener device of the present invention may provide, for example, a conduit for material to pass between the first side 220 and the second side 230 of the at least one component 210. In addition, this embodiment may further allow wiring, cord, rope, fluids (including air and/or various types of liquids) to pass through the fastener device 100 to the second side 230 of the at least one component 210.

As shown in FIGS. 6 and 7, the fastener device 100 according to some embodiments of the present invention may further comprise an extension device 610 operably engaged with the first portion 112 of the sleeve 110 configured to extend therefrom so as to be capable of operably engaging a second extension device 610a extending from a second fastener device 100a such that the at least one component 210 may be attached to at least one second component 210c defining a second aperture 240a having the second fastener device 100a extending therethrough. As shown in FIG. 6, the extension device 610 may further comprise a connecting aperture 620 configured to receive, for instance a flanged bolt 630 (see FIG. 7) suitable for connecting two extension devices 610, 610a as shown in FIG. 7. The connecting aperture 620 may further comprise (as shown generally in FIG. 6) a slot, configured to receive, for instance, a flanged bolt 630 and a butterfly nut operably engaged therewith. As such, this embodiment may allow for the fastening of two separate components (such as two separate sheets 210, 210c) while allowing for a desired adjustable spacing between the separate sheets 210, 210c. In addition, the connecting aperture 620 defined in the extension device 610 may allow the two separate sheets 210, 210c to be mounted in a non-parallel arrangement with respect to each other, at for instance, an oblique angle relative to one another.

As shown in FIG. 8, and according to another advantageous embodiment of the present invention, the fastener device 100 may further comprise a cord receiver device 710 operably engaged with the first portion 112 of the sleeve 110 and configured to extend from the first portion 112 of the sleeve 110 so as to be further configured to be capable of operably engaging a cord 720 such that the cord 720 may be attached to the at least one component 210. The cord 720 may comprise, for instance, polymeric resilient "bungee" cord, twine, string, or other types of cord material or connectors (such as hooks or carabiner devices) suited for threading through the cord receiver 710. The cord receiver 710 may further comprise a ring 715 through which the cord 720 may be passed and subsequently knotted so as to increase the diameter of the cord 720 and thereby retain the cord 720 in the ring 715. In other embodiments, the cord 720 may be passed through the ring 715 and subsequently tied to an object (such as, for instance, a washer) that is suitably large for retaining the cord 720 in the ring 715 such that the cord 720 may be attached to the cord receiver device 710 and thereby be attached to the at least one component 210 with which the fastener device 100 may be engaged. As described above with respect to FIGS. 21-22, an alternate embodiment of the cord receiver device 155a-c may be used not only to receive cord, line, or connectors, but also as tools for actuating a second fastener device 110a.

FIGS. 9-13 show an alternate embodiment of the fastener device 100 wherein the slug 120 further comprises a plug insert 141 inserted through the slug 120 and sleeve 110 at the first portion 112 as well as a separate nut 150 for securing the fastener device 100 relative to the first side 220 of the at least one component 210a, 210b. As shown generally in FIGS. 10 and 11, the plug insert 141 may be inserted into a slug aperture 146 defined in the slug and a corresponding guide aperture 115 defined in the first portion 112 of the sleeve 110. Thus, the plug insert 141 may be configured to be capable of preventing the slug 120 from being removed from the sleeve from the first side 220 (See FIG. 12B). As shown generally in FIGS. 13A-13B, the tab device 130 may further comprise a guide slot 132 configured to be capable of receiving the at least one pin 122 extending from the slug 120 such that the tab device 130 may be extended and/or retracted by the rotation of the slug 120. In addition, the plug insert 141, in cooperation with the guide aperture 115 defined in the sleeve 110, may limit the rotational movement of the slug 120 with respect to the sleeve 110 such that the slug 120 may rotate only through an angle sufficient to extend and/or retract the tab device 130 substantially laterally outward and/or inward from the second portion 114 of the sleeve 110. Thus, the tab device 130 may cooperate with the slug 120 so as to become selectively engaged with the second side 230 of the at least one component 210a, 210b. For example, as shown in FIGS. 11 and 12B the guide aperture 115 may further define a first catch stop 115a configured to retain the plug insert 141 in the retracted position (wherein the tab device 130 is retracted within the sleeve 110 as shown in FIG. 13A) and a second catch stop 115b configured to retain the plug insert 141 in the extended position (wherein the tab device 130 is extended as shown in FIG. 13B and operably engaged with the second side 230 of the at least one component 210a, 210b).

In contrast to the embodiments described above with respect to FIGS. 14A-15E, the plug insert 141 of the embodiment shown in FIGS. 9-11 may not extend past the guide aperture 115. Thus, in this embodiment, the tab device 130 may be actuated by a first tool interface 124 and a corresponding tool (such as a wrench 125 as shown generally in FIG. 12A). However, the plug insert 141 may be visible through the guide aperture 115 defined in the sleeve 110 as shown in FIG. 9 such that a user of the fastener device 100 may discern the position of the tab device 130 (extended or retracted, for example) by viewing the position of the plug insert 141 relative to the first and second catch stops 115a, 115b (see FIGS. 11 and 12B). Such a visual indication of the status of the tab device 130 may be especially useful in embodiments wherein the fastener device 100 is inserted into a blind aperture and wherein the user of the fastener device may be unable to visually confirm the extension of the tab device 130 in response to the rotation of the first tool interface 124. In some embodiments, visual indicia, such as the words "ENGAGE" and "DISENGAGE" or various pictures or symbols may be printed, embossed, or etched on an outer surface of the sleeve 110 adjacent to the first and second catch stops 115a, 115b to provide a positive indication of the position of the tab device 130 based on the position of the visible end portion of the plug insert 141 relative to the first and second catch stops 115a, 115b defined in the guide aperture 115.

In addition, as shown in FIG. 10, the sleeve 110 may further comprise a grip flank 129 defined in the first portion 112 of the sleeve 110 to facilitate holding (via hand/finger grip or specialized corresponding tool) of the fastener device 100 during the tightening of the nut 150 relative to the first portion 112 of the sleeve 110. Also as shown in FIG. 10, the slug 120 may further comprise a first tool interface 124 adapted to be capable of being engaged and actuated by a tool (such as a wrench 125, as shown generally in FIG. 12A). As shown in FIG. 12A, the wrench 125 may comprise an actuating aperture 125a for operably engaging and actuating the first tool interface 124 to rotate the slug 120 within the sleeve 110 and therefore operably engage the tab device 130 with the second side 230 of the at least one component 210a, 210b. Furthermore, the wrench 125 may further comprise a tightening aperture 125b for operably engaging and rotating the nut 150 about the outer threaded portion 117 of the sleeve 110 so as to bring the nut 150 into engagement with the first side 220 of the at least one component 210a, 210b. FIG. 12B shows a profile view of the position of the fastener device 100 relative to the at least one component 210a, 210b during the fastening process. For example, FIG. 12B shows the insertion of the fastener device into an aperture defined in the at least one component 210a, 210b, followed by the extension of the tab device 130, and finally the tightening of the nut 150 to secure the fastener device 100 with respect to both sides 220, 230 of the at least one component 210a, 210b.

FIGS. 16A-18D show another embodiment of the fastener device 100 of the present invention wherein the nut 150 comprises a locking washer portion 150b and an indentation 150a (such as an elongated slot) for operably engaging the plug insert 141 (in embodiments wherein the plug insert 141 (for rotating the slug 120 and thereby extending the tab device 130) extends outward from the guide aperture 115 defined in the first portion 112 of the sleeve 110). The nut 150 may be disposed at least partially around an outer surface of the first portion 112 of the sleeve 110 and configured to be capable of being tightened with respect to the first side 220 (see FIGS. 18A-18D) so as to selectively prevent the sleeve 110 from being removed from the aperture through the second side 230. Thus, the nut 150 (via the indentation 150a or other interface for extending the tab device 130) may be operably engaged with the actuator device (such as the rotatable slug 120 operably engaged with the tab device 130) such that the nut 150 may be capable of actuating the actuator device (and extending the tab device 130 to engage the second side 230 of the at least one component 210a, 210b) from the first side 220.

Furthermore, as shown in detail in FIG. 16A, the nut may comprise a locking washer portion 150b comprising a plurality of teeth extending at least partially radially outward from the nut 150 and being biased at least partially towards the second portion 114 of the sleeve 110. The locking washer portion 150b may be configured to be capable of deforming towards the first portion 112 of the sleeve 110 as the nut 150 is tightened with respect to the first side 220 of the at least one component 210a, 210b (see FIG. 18C, for example). Thus, the fastener device 100 may be substantially secured within the aperture by the cooperation of the nut 150 (and the locking washer portion 150b thereof) and the tab device 130 extending from the second portion 114 of the sleeve 110.

According to another fastener device 100 embodiment shown in FIGS. 16A and 16B, the fastener device 100 comprises both a nut 150 (capable of operably engaging the actuating device via the plug insert 141) and a locking ring 151 (capable of selectively engaging and/or disengaging the nut 150 with respect to a ratchet surface 110a and pawl catch 110b defined in an outer surface of the sleeve 110 of the fastener device 100). As described generally above, the nut 150 may comprise an indentation 150a (for receiving and operably engaging the plug insert 141 or other actuating device capable of extending or retracting the tab device 130) and a toothed locking washer portion 150b. In addition, the nut 150 may also comprise (as shown in FIG. 16A), a ribbed finger grip surface 150c such that a user of the fastener device 100 may more easily rotate the nut 150 with respect to the outer surface of the sleeve 110 in order to actuate the slug 120 (and thereby extend the tab device 130 (as shown in the sequence of steps generally illustrated in FIGS. 18A-18D). As shown in FIGS. 16A and 16B, the locking ring 151 may be separate from the nut 150 and comprise a pawl member 151a configured to be capable of extending through a pawl aperture 150d defined in the nut 150 in order to engage a pawl catch 110b (such as a cut-out defined in the outer surface of the sleeve 110 of the fastener 100 as shown in the exploded view of FIG. 16B).

Furthermore, the nut 150 may be rotatable between a first position (see FIG. 18A) and a second position (see FIG. 18B) and, as described above, define an indentation 150a for receiving the plug insert 141 as it extends through the guide aperture 115 (defined in the sleeve 110) such that the nut 150 may cooperate with plug insert 141 to rotate the slug 120. As shown in FIGS. 16A-16B, the indentation 150a may comprise an elongated slot such that the indentation 150a may remain operably engaged with the plug insert 141 throughout the fastening process (as described below with respect to FIGS. 18A-18D). Furthermore, as described in the various embodiments above, the tab device 130 may be responsive to the slug 120 as the nut 150 is rotated so as to retract laterally inward through the slit 116 to a retracted position as the nut 150 is rotated to the first position (see FIG. 18A), and to extend laterally outward through the slit 116 to an extended position (see FIG. 18B) as the nut 150 is rotated to the second position.

In addition, and as shown in detail in FIGS. 16A and 16B, an outer surface of the first portion 112 of the sleeve 110 may define both a ratchet surface 110a and a pawl catch 110b for operably engaging the pawl member 151a extending radially inward from the nut 150 (or from a separate locking ring 151 disposed about the nut 150 as shown in FIGS. 16A-16B). For example, the pawl member 151a may extend radially inward (towards the outer surface of the first portion of the sleeve 110) from the locking ring 151 (through the pawl aperture 150d defined in the nut 150) to operably engage the pawl catch 110b when the nut 150 is rotated to the first position (see FIG. 18A). Furthermore, as shown in FIG. 18B, as the nut 150 is rotated to the second position (see FIG. 18B), the pawl member 151a is also rotated so as to be capable of engaging the ratchet surface 110a (defined on the outer surface of the sleeve 110 adjacent to the pawl catch 110b). Thus, when the nut is rotated to the second position (corresponding to the extension of the tab device 130, as shown in FIG. 18B) the nut 150 is capable of advancing toward the second portion 114 of the sleeve via a ratcheting mechanism resulting from the interaction of the pawl member 151a with the ratchet surface 110a when the tab device 130 is in the extended position (as shown in FIG. 18C).

As described above, and shown in FIGS. 16A-16B, the pawl member 151a may be operably engaged with a locking ring 151 separate from and encircling the nut 150. Thus, the nut 150 defines a pawl aperture 150d through which the pawl member 151a is configured to extend so as to engage the ratchet surface 110a. The pawl member 151a may be substantially deformable such that the pawl member 151a is further configured to be capable of disengaging the ratchet surface 110a as the locking ring 151 is moved with respect to the nut 150. For example, as shown generally in FIG. 18D, the locking ring 151 may be advanced towards the second portion 114 of the sleeve 110 such that the pawl member 151a is deformed outward (via interaction with the pawl aperture 150d) and disengages the ratchet surface 110a such that the nut 150 may be moved towards the first portion 112 of the sleeve 110 to the position shown generally in FIG. 18B. Thus, according to such embodiments, the fastener may be engaged and subsequently selectively disengaged from the aperture 240 defined in the at least one component 210a, 210b by manipulating the nut 150 and locking ring 151 with respect to the sleeve 110 of the fastener device 100. Thus, fastener devices 100 of the embodiments shown in FIGS. 18A-18D may be more easily manipulated by one hand in cases where the fastener 100 may be deployed in areas lacking sufficient space for the use of two hands or tools (such as wrenches). In addition, the fastener device 100 may be easily deployed by a user having only one free hand.

The fastener device 100 of the present invention, and the components thereof, may comprise a variety of different materials that may be suitable for tailoring the fastener device 100 for use in a variety of environments, for a number of different uses, and for attachment to a variety of different materials. For instance, the sleeve 110, tab device 130 and nut 150 may be composed of a hard metallic material, such as, for instance, stainless steel so as to provide a durable bearing surface for retaining the fastener device 100 within the aperture 240 defined in the at least one component. For some applications, however, it may be advantageous if the bearing surfaces of the fastener device 100 comprise, for instance, aluminum or carbon fiber composite materials such as in aviation applications wherein the weight of multiple fastener devices may be a consideration in the design of the at least one component. In addition, in embodiments of the present invention wherein the fastener device 100 further comprises a conduit 126 (defined, for instance, in the slug 120) it may be advantageous to provide a liner material such as PTFE or another polymeric material in the walls of the conduit 126 so as to ease the passage of material therethrough and/or provide protection to the sleeve 110 and other components of the fastener device 100 from potentially corrosive material that may pass through the conduit between the first side 220 and the second side 230 of the at least one material. One skilled in the art will appreciate that the various components of the fastener device 100 of the present invention may be composed of a variety of specialty materials suitable for the application chosen for the fastener device 100.

Referring again to FIGS. 2A-2C a method for facilitating the attachment of a fastener device 100 comprising a sleeve 110 to at least one component 210 having a first side 220 and a second side 230 is described. According to one embodiment, the method of the present invention may first comprise the step of freely inserting the fastener device 100 through an aperture 240 defined by the at least one component 210 (210a, 210b) such that a first portion 112 of the sleeve 110 extends from the aperture 240 on the first side 220, and such that a second portion 114 of the sleeve 110 extends from the aperture 240 on the second side 230. The method further comprises the step of selectively expanding a tab device 130 from a slit 116 defined by the second portion 114 of the sleeve 110 so as to selectively prevent the sleeve 110 from being removed from the aperture 240 through the first side 220.

According to other embodiments, the method of the present invention may further comprise the steps of: tightening a nut 150 disposed at least partially around an outer surface of the first portion 112 of the sleeve 110 such that the nut 150 is secured with respect to the first side 220 so as to selectively prevent the sleeve 110 from being removed from the aperture 240 through the second side 230; locking the nut 150 in a tightened position with respect to the first side 220; inserting a plug device 140 or plug insert 141 within the sleeve 110 between the first side 220 and the slug 120 so as to prevent the slug 120 from being removed from the sleeve 110 through the first side 220; and locking the plug device 140 or plug insert 141 with respect to the slug 120.

According to other embodiments of the method of the present invention, the use of the nut 150 as described above may be replaced or supplemented by the use of a flange 155.

According to other embodiments of the method of the present invention, the expanding step described above may further comprise rotating a slug 120 disposed at least partially within the sleeve 110, wherein the slug 120 is operably engaged with the tab device 130 so as to be further configured to be capable of expanding the tab device 130 from the slit 116 so as to selectively prevent the sleeve 110 from being removed from the aperture 240 through the first side 220.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A fastener device comprising:
    a sleeve adapted to extend through an aperture defined by at least one component having a first side and a second side, a first portion of the sleeve being configured to extend from the aperture on the first side and comprising a flange disposed at least partially around an outer surface of the first portion of the sleeve so as to prevent the sleeve from being removed from the aperture through the second side, a second portion of the sleeve being configured to extend from the aperture on the second side, wherein the second portion of the sleeve defines a slit;
    an actuator device operably engaged with the first portion of the sleeve and configured to be actuated from the first side, wherein the actuator device comprises a slug disposed at least partially within the sleeve, the slug configured to be capable of rotating with respect to an inner surface thereof upon being actuated from the first side;
    a tab device operably engaged with the second portion of the sleeve and capable of operably engaging the slug in the actuator device, the tab device being responsive to the slug as the slug is rotated so as to extend substantially laterally outward through the slit to an extended position as the slug is rotated in a first direction, and to retract laterally inward through the slit to a retracted position as the slug is rotated in a second direction, the tab device thereby cooperating with the slug so as to become selectively engaged with the second side of the at least one component such that the fastener device is substantially secured within the aperture by the cooperation of the flange and the tab device;
    a guide aperture defined in the first portion of the sleeve;
    a slug aperture defined in the slug; and
    a plug insert disposed within the slug aperture and extending radially outward from the slug aperture and at least partially through the guide aperture, the plug insert being configured to be capable of rotating the slug in the first direction and in the second direction with respect to the sleeve, wherein the plug insert comprises a structure chosen from the group consisting of:

a split ring extending through the guide aperture and the slug aperture so as to allow a user to rotate the slug by hand;

a split D-ring comprising a straight portion extending through the slug aperture and a curved portion extending from the straight portion and through the guide aperture; and a straight insert comprising a substantially straight portion extending through the slug aperture operably engaged with a textured portion extending from the guide aperture, the textured portion being configured to be capable of being actuated by a single fingertip.

* * * * *